(12) United States Patent
Mustafa

(10) Patent No.: US 8,490,584 B2
(45) Date of Patent: Jul. 23, 2013

(54) AIR HYBRID ENGINE WITH DUAL CHAMBER CYLINDER

(76) Inventor: Rez Mustafa, Covina, CA (US)

( * ) Notice: Subject to any disclaimer, the term of this patent is extended or adjusted under 35 U.S.C. 154(b) by 652 days.

(21) Appl. No.: 12/756,895

(22) Filed: Apr. 8, 2010

(65) Prior Publication Data

US 2010/0192878 A1  Aug. 5, 2010

Related U.S. Application Data

(63) Continuation-in-part of application No. 12/238,203, filed on Sep. 25, 2008, now Pat. No. 8,191,517.

(51) Int. Cl.
*F02B 63/00* (2006.01)

(52) U.S. Cl.
USPC ........ 123/2; 123/559.1; 123/197.4; 123/70 R; 123/318

(58) Field of Classification Search
USPC ........... 123/70 R, 559.1, 196 R, 197.3, 197.4, 123/318, 2
See application file for complete search history.

(56) References Cited

U.S. PATENT DOCUMENTS

| | | | |
|---|---|---|---|
| 385,226 A | 6/1888 | Barden | |
| 1,045,505 A | 11/1912 | Brauer | |
| 1,122,972 A | 12/1914 | Maye | |
| 1,374,164 A | 4/1921 | Nordwick | |
| 1,419,693 A | 6/1922 | Schultz | |
| 1,528,164 A | 3/1925 | Nordwick | |
| 1,654,378 A | 12/1927 | Marchetti | |
| 1,828,060 A | 10/1931 | Michael | |
| 3,517,652 A | 6/1970 | Albertson | |
| 3,584,610 A | 6/1971 | Porter | |
| 3,820,337 A | 6/1974 | Martin | |
| 3,842,812 A * | 10/1974 | Marcus | 123/318 |
| 3,859,968 A * | 1/1975 | Stinebaugh | 123/317 |
| 3,973,532 A * | 8/1976 | Litz | 123/317 |
| 4,003,351 A | 1/1977 | Gunther | |
| 4,013,048 A | 3/1977 | Reitz | |
| 4,205,638 A * | 6/1980 | Vlacancinch | 123/46 A |
| 4,459,945 A | 7/1984 | Chatfield | |
| 4,461,251 A * | 7/1984 | Sheaffer | 123/317 |
| 4,475,499 A * | 10/1984 | Sheaffer | 123/317 |
| 4,480,599 A | 11/1984 | Allais | |
| 4,545,336 A | 10/1985 | Waide | |
| 4,558,671 A * | 12/1985 | Stinebaugh | 123/317 |
| 4,759,188 A * | 7/1988 | Schatz | 60/605.1 |

(Continued)

FOREIGN PATENT DOCUMENTS

WO   WO98/49434   11/1998

*Primary Examiner* — Noah Kamen
*Assistant Examiner* — Grant Moubry
(74) *Attorney, Agent, or Firm* — Kirk A. Buhler; Buhler & Associates

(57) ABSTRACT

The air hybrid engine with dual chamber cylinder with an air storage tank is an energy recovery unit from deceleration and breaking the vehicle and will perform as power management. During deceleration mode of a vehicle where the compressor chamber in the engine will recover energy by compressing the air and storing the compressed in a storage tank. During acceleration mode the engine will run in a mixed mode, conventional mode and air motor mode. The compressed air can also be used for starting the engine. The engine will operate in the "sweet spot" to optimize fuel consumption by using the lower chamber and or upper chamber in compression mode or an idle mode. The compressed air from the air storage tank can be used for other purposes such as air suspension and or to power pneumatic tools.

18 Claims, 18 Drawing Sheets

U.S. PATENT DOCUMENTS

| | | |
|---|---|---|
| 4,945,725 A | 8/1990 | Carmein |
| 5,454,352 A * | 10/1995 | Ward .......................... 123/53.3 |
| 5,579,735 A * | 12/1996 | Todero et al. ................ 123/317 |
| 5,606,943 A * | 3/1997 | Tamba et al. ............. 123/90.23 |
| 5,791,303 A | 8/1998 | Skripov |
| 6,976,467 B2 * | 12/2005 | Fantuzzi .................... 123/197.1 |
| 7,121,236 B2 | 10/2006 | Scuderi |
| 7,177,751 B2 * | 2/2007 | Froloff et al. ................. 701/102 |
| 8,191,517 B2 * | 6/2012 | Mustafa ...................... 123/70 R |
| 2001/0017122 A1 | 8/2001 | Fantuzzi |
| 2004/0261732 A1 | 12/2004 | Fantuzzi |
| 2005/0095770 A1 | 10/2005 | Major |
| 2008/0121196 A1 * | 5/2008 | Fantuzzi ..................... 123/55.2 |
| 2012/0222658 A1 * | 9/2012 | Rez ............................ 123/559.1 |

* cited by examiner

Intake and Exhaust Lobe for Two-Cycle

Intake and Exhaust Lobe for Four-Cycle Engine

AIR HYBRID ENGINE WITH DUAL CHAMBER CYLINDER

CROSS REFERENCE TO RELATED APPLICATION

This application is a continuation-in-part of applicant's co-pending application Ser. No. 12/238,203 filed Sep. 25, 2008 and PCT application PCT/US2008/011352 filed Oct. 2, 2008 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in an internal combustion engine. More particularly the improvement reduces the friction between the piston and cylinder wall to near zero and eliminated the cam shaft, crank shaft starter and outside super charger or turbo charger. The improvements can reduce the energy consumption and reduce emission.

The invention is energy recovery during deceleration of the vehicle will be done by a compressor in the engine and not by a braking system where an air compressor sends compressed air to a storage tank to reuse the compressed air in the engine for starting and acceleration.

The invention reduces the energy consumption by using the dual chamber cylinder compressor in compression mode or in idle mode for energy management strategies and runs the engine in a "sweet spot" of energy consumption optimization.

This invention, when used as a two-stroke engine, each cylinder will stroke two times in one revolution whereas in a conventional engine, with four cylinders, will stroke two times in one revolution that will make the one dual chamber cylinder engine/compressor equivalent to four cylinders of a conventional engine. The lower chamber is used as a compressor for energy recovery during deceleration.

This invention, when used as a four-stroke engine, the engine will stroke four times in one revolution. In a conventional engine, with four cylinders, will stroke two times in one revolution that makes one dual chamber cylinder engine/compressor equivalent to two cylinders of a conventional engine plus the lower chamber can be used as a supercharger and as energy recovery during deceleration.

2. Description of Related Art Including Information Disclosed Under 37 CFR 1.97 and 1.98:

Numerous patents have been issued on piston driven engines. The majority of these engines use pistons that move up and down in a cylinder. The piston is connected to a crank shaft and the piston pivots on a wrist pin connected to the piston connecting rod. The side-to-side motion of the piston rod eliminates the potential for a sealing surface under the piston. The design of an engine with piston rods that remain in a fixed orientation to the piston allow for a seal to exist under the piston and this area can be used as a pump to increase the volume of air being pushed into the top of the piston to turbo-charge the amount of air within the cylinder without use of a conventional turbo charger driven from the exhaust or the output shaft of the engine. Several products and patents have been issued that use piston rods that exist in fixed orientation to the piston. Exemplary examples of patents covering these products are disclosed herein.

U.S. Pat. No. 3,584,610 issued Jun. 15, 1971 to Kilburn I. Porter discloses a radial internal combustion engine with pairs of diametrically opposed cylinders. While the piston arms exist in a fixed orientation to the pistons the volume under the pistons is not used to pump air into the intake stroke of the engine.

U.S. Pat. No. 4,459,945 issued Jul. 17, 1984 to Glen F. Chatfield discloses a cam controlled reciprocating piston device. One or opposing two or four pistons operates from special cams or yokes that replace the crankpins and connecting rods. While this patent discloses piston arms that are fixed to the pistons there also is no disclosure for using the area under each piston to move air into the intake stroke of the piston.

U.S. Pat. No. 4,480,599 issued Nov. 6, 1984 to Egidio Allais discloses a free-piston engine with operatively independent cam. The pistons work on opposite sides of the cam to balance the motion of the pistons. Followers on the cam move the pistons in the cylinders. The reciprocating motion of the pistons and connecting rod moves a ferric mass through a coil to generate electricity as opposed to rotary motion. The movement of air under the pistons also is not used to push air into the cylinders in the intake stroke.

U.S. Pat. No. 6,976,467 issued Dec. 20, 2005 and published application US2001/0017122 published Aug. 30, 2001, both to Luciano Fantuzzi disclose an internal combustion engine with reciprocating action. The pistons are fixed to the piston rods, and the piston rods move on a guiding cam that is connected to the output shaft. These inventions use the piston was as a guide for reciprocating action and thereby produce pressure on the cylinder walls. The dual chamber design uses piston wall and a guided tube in the bottom of the lower chamber as guides for the piston in the reciprocating action. Neither of these two documents discloses using the lower chamber as a supercharger.

What is needed is an engine where the underside of the piston is used to compress the air and work as a supercharger for the upper chamber cylinder and uses the lower chamber and or the upper chamber for energy recover during deceleration. This application discloses and provides that solution.

BRIEF SUMMARY OF THE INVENTION

It is an object of the air hybrid engine with dual chamber cylinders to utilize the underside of a piston to act as a supercharger or compressor for the engine use or other uses and as energy recovery during deceleration.

It is an object of the engine with dual chamber cylinders to use a guided tube in the bottom of the cylinder and an ellipse shaft to convert reciprocating rectilinear motion into rotational motion.

It is an object of the air hybrid engine with dual chamber cylinders to use the upper chamber as a four-stroke engine and the lower chambers as a compressor or supercharger or for energy recovery during deceleration.

It is an object of the air hybrid engine with dual chamber cylinders to use a two-stroke engine by using the upper chamber as combustion/exhaust and or as an air/compressor and a lower chamber can be used as a compressor for energy recovery during deceleration.

It is an object of the air hybrid engine with dual chamber cylinders to eliminate friction that is created by the piston rocking and being pushed and pulled side-to-side with the piston arm. The side-to-side force is eliminated because the piston is pushed and pulled linearly within the cylinder thereby eliminating the side-to-side rotation and friction.

It is an object of the air hybrid engine with dual chamber cylinders to utilize the underside of a piston to act as a compressor during deceleration for energy recovery.

It is an object of the air hybrid engine with dual chamber cylinders to be used as an airplane engine because the engine can be lighter in weight and higher in efficiency.

It is an object of the air hybrid engine with dual chamber cylinders to eliminate the crankshaft camshaft, cam sprocket, timing belt, timing belt tensioner, outside supercharger or turbocharger starter, battery, generator and motor. All of the space required by the identified components reduces the space, weight and cost and energy consumption.

It is an object of the air hybrid engine with dual chamber cylinders to save energy of the dual chamber verses existing four-stroke engine because the engine is lighter, lower friction, no side forces in the piston, fewer parts and uses a lower chamber as a compressor for energy recovery.

It is still another object of the air hybrid engine with dual chamber cylinders to save energy by using the dual chamber compressor for energy management strategies and run the engine in the "sweet spot" of energy conservation and by deceleration of the vehicle by using the dual chamber compressor in the engine and not use the braking system.

It is still another object of the air hybrid engine to save energy by recovery of energy from the braking system.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 3:
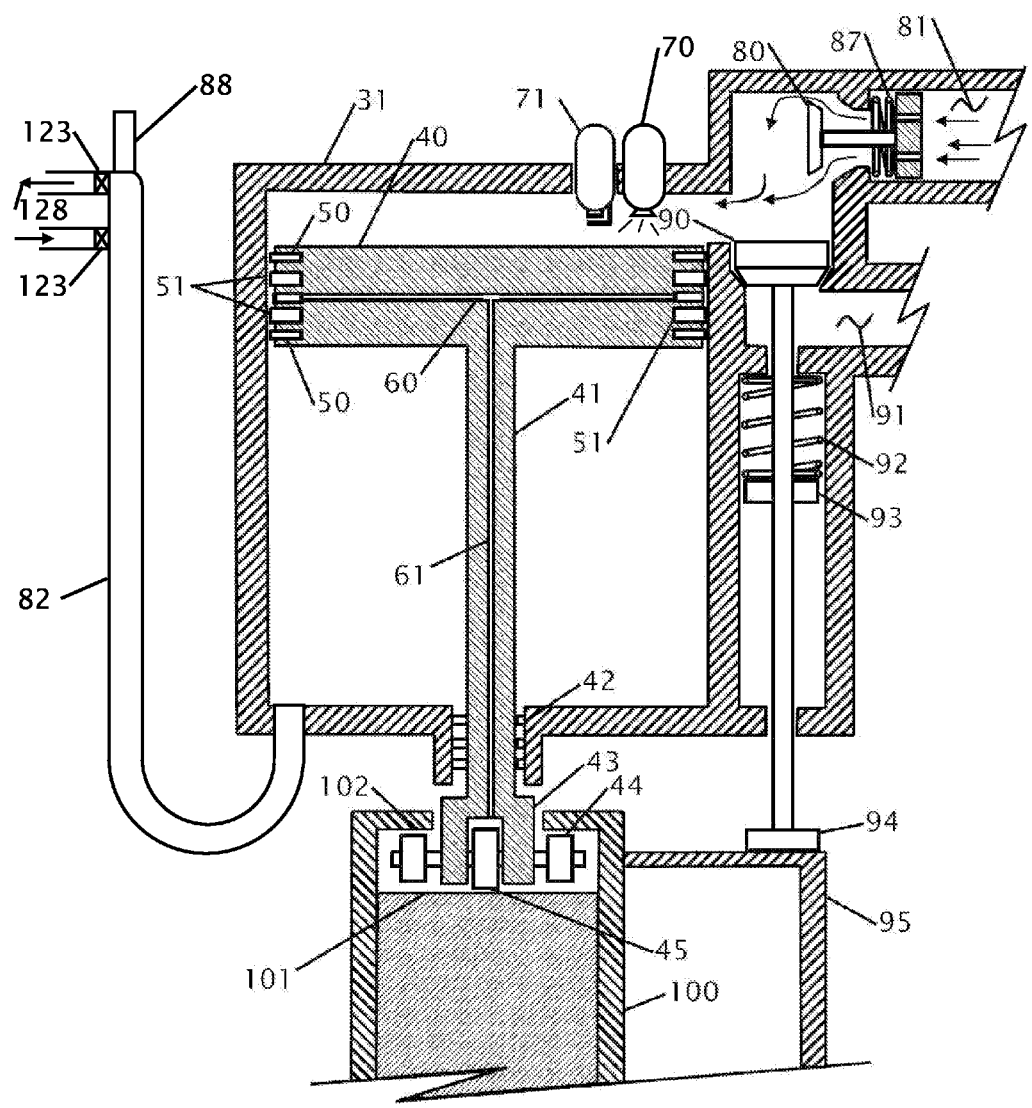

FIG. 3 cut-away view of a first preferred embodiment of the dual chamber cylinder Type I and Type II at air pressure intake.

Figure 4:
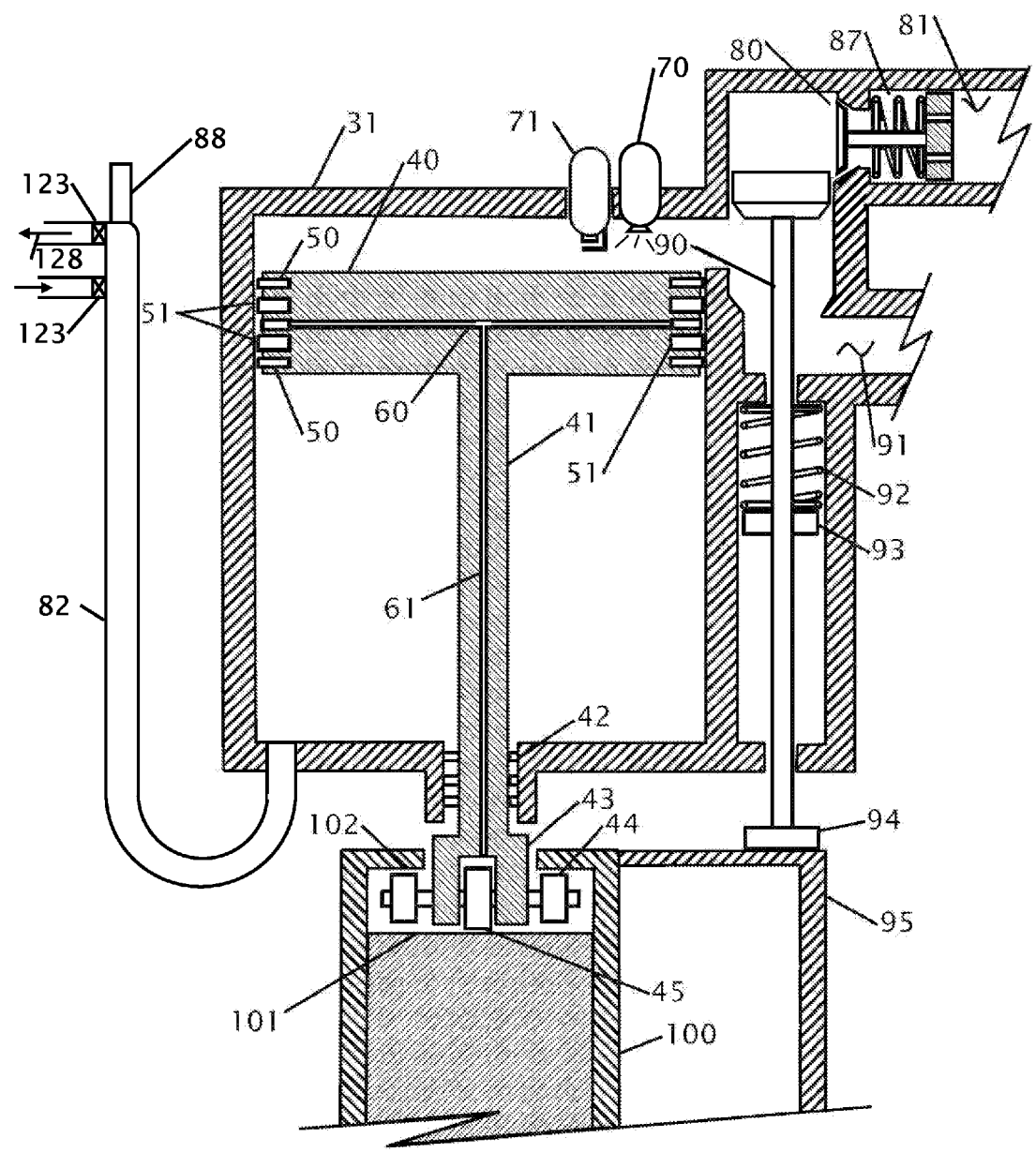

FIG. 4 shows a cut-away view of the first preferred embodiment of the dual chamber cylinder Type I and Type II at exhaust.

Figure 5:
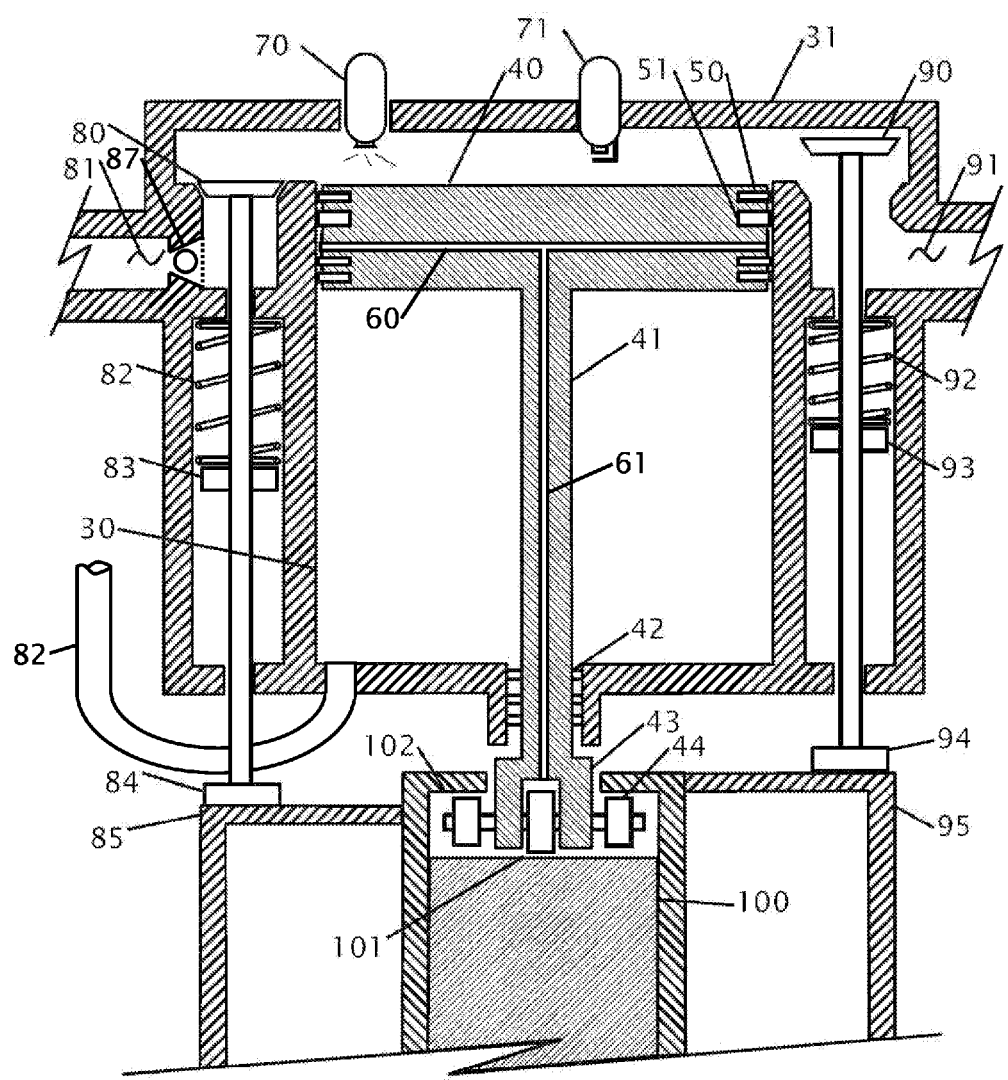

FIG. 5 shows a cut-away view of a second preferred embodiment of the dual chamber cylinder type III.

Figure 6:
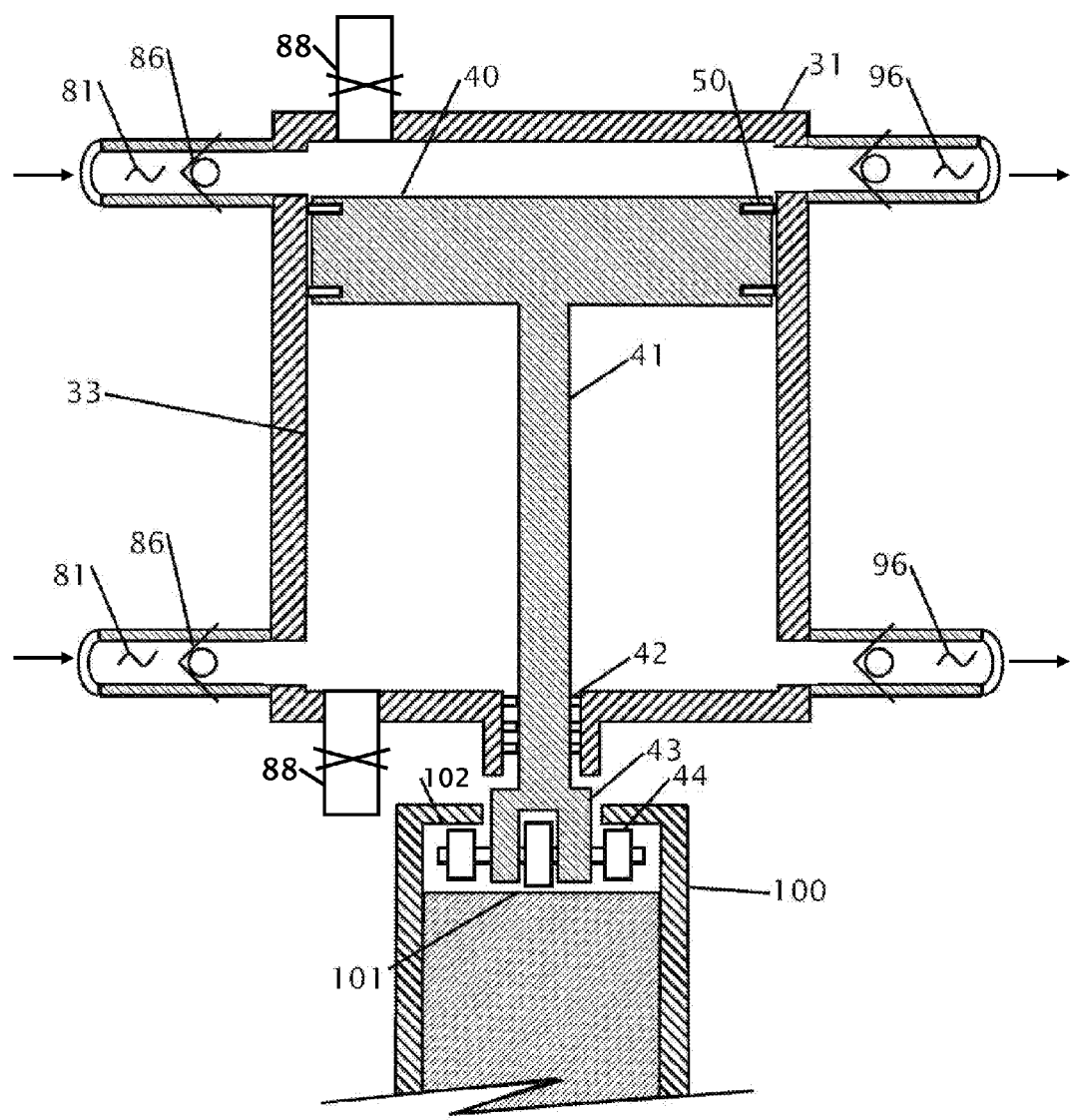

FIG. 6 shows a cut-away view of the dual chamber cylinder.

Figure 7:
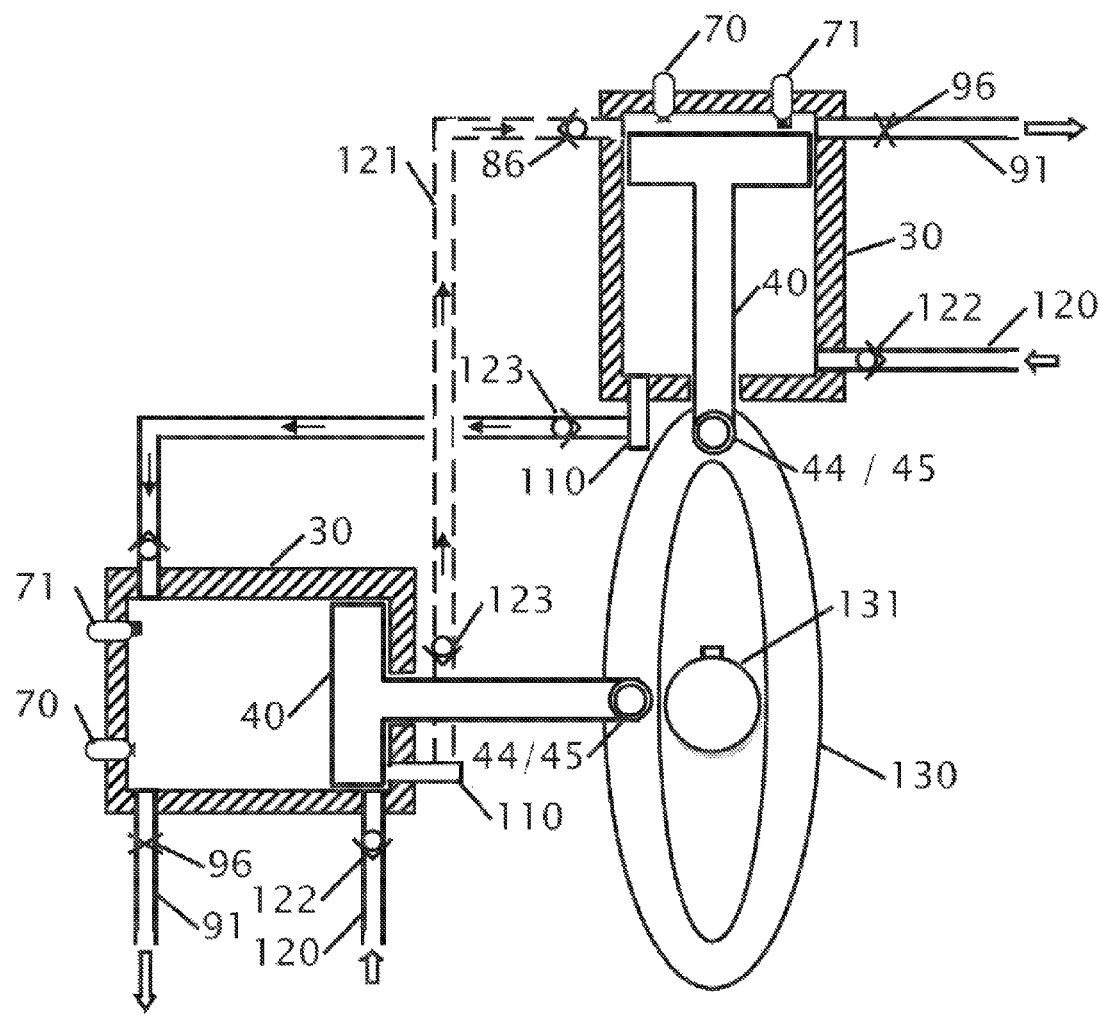

FIG. 7 shows a block diagram of the operation of the two-cylinder/two-stroke engine.

Figure 8:
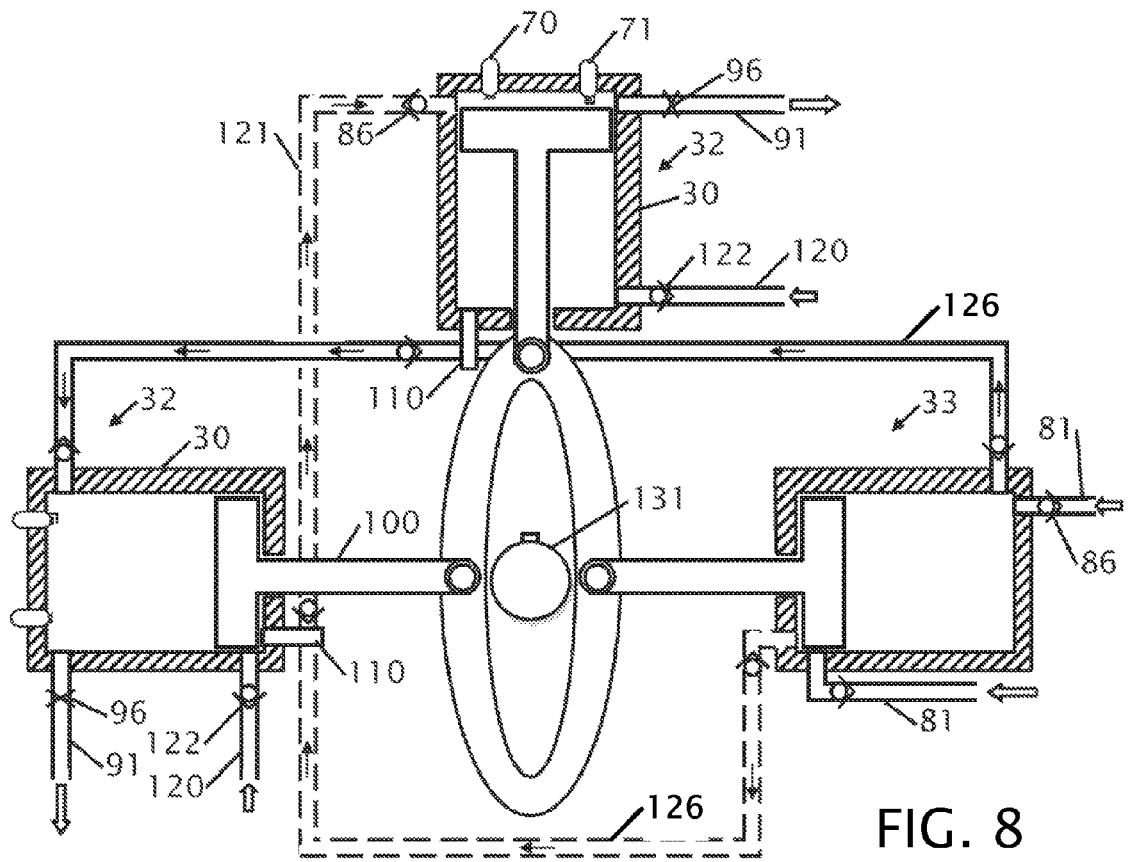

FIG. 8 shows a block diagram of two-cylinder, two-stroke engine with a supercharger cylinder.

Figure 9:
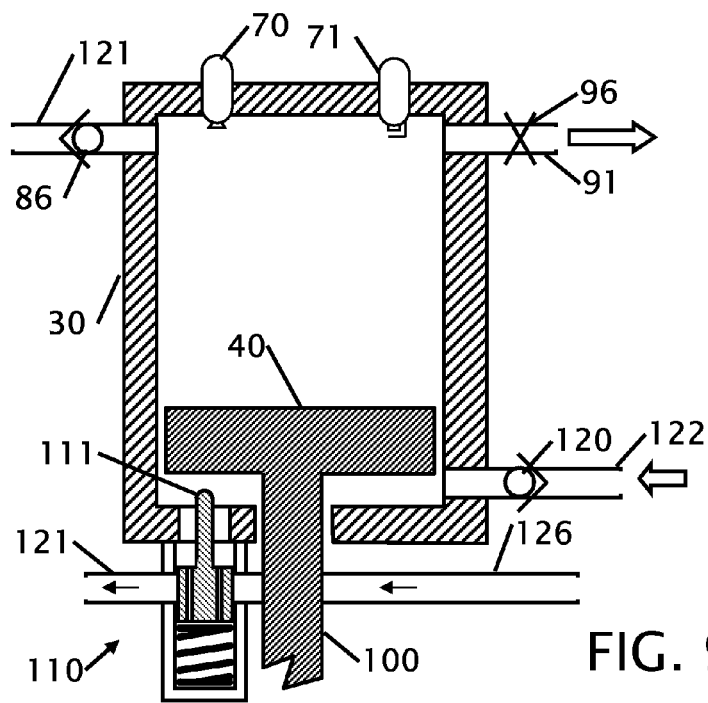

FIG. 9 shows a dual chamber cylinder for a two-stroke engine with a piston valve.

Figure 10:
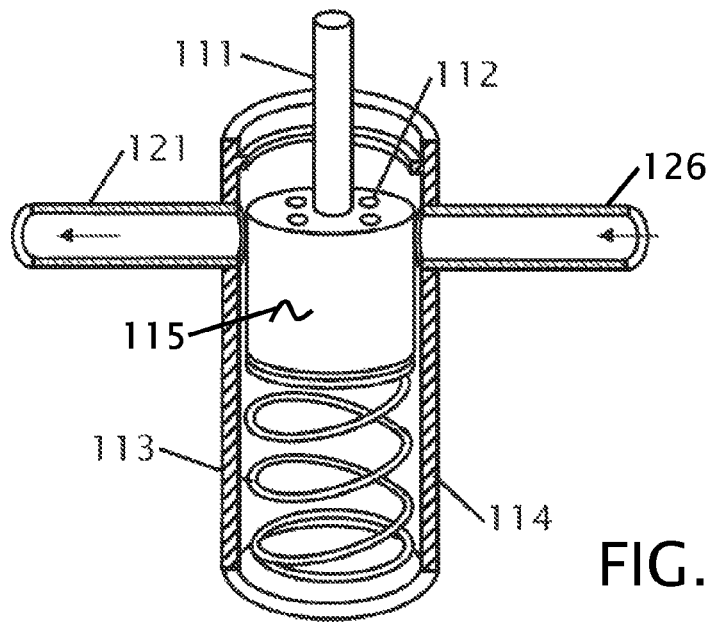

FIG. 10 shows a detail view of a piston valve.

Figure 11:
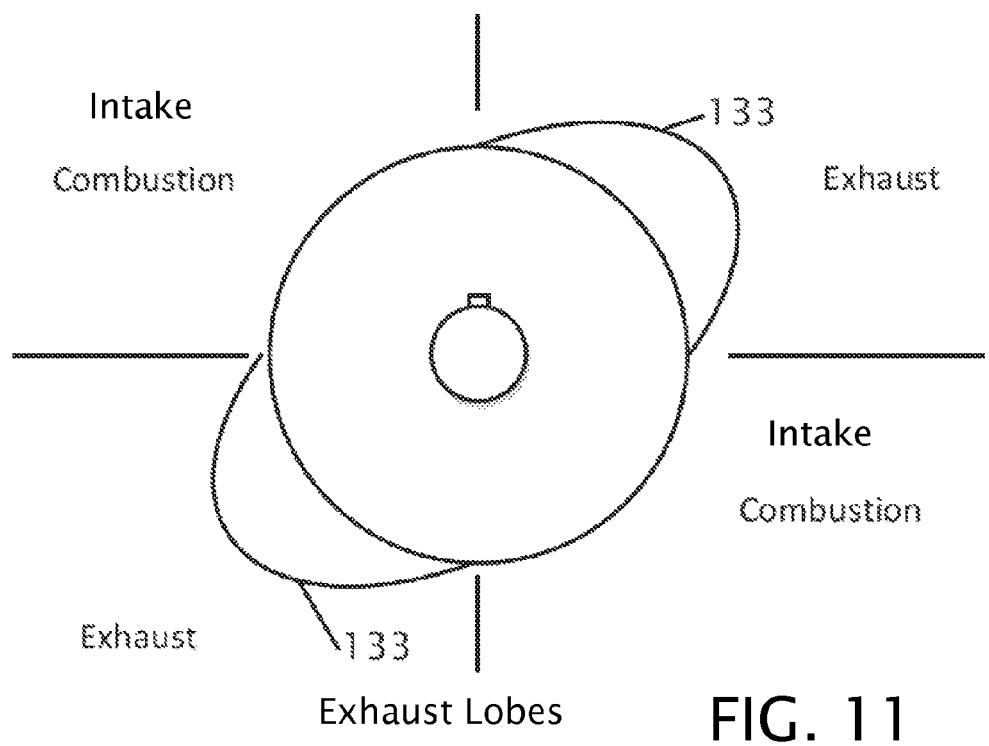

FIG. 11 shows a cam lobe(s) for an exhaust valve for a two-stroke engine.

Figure 12:
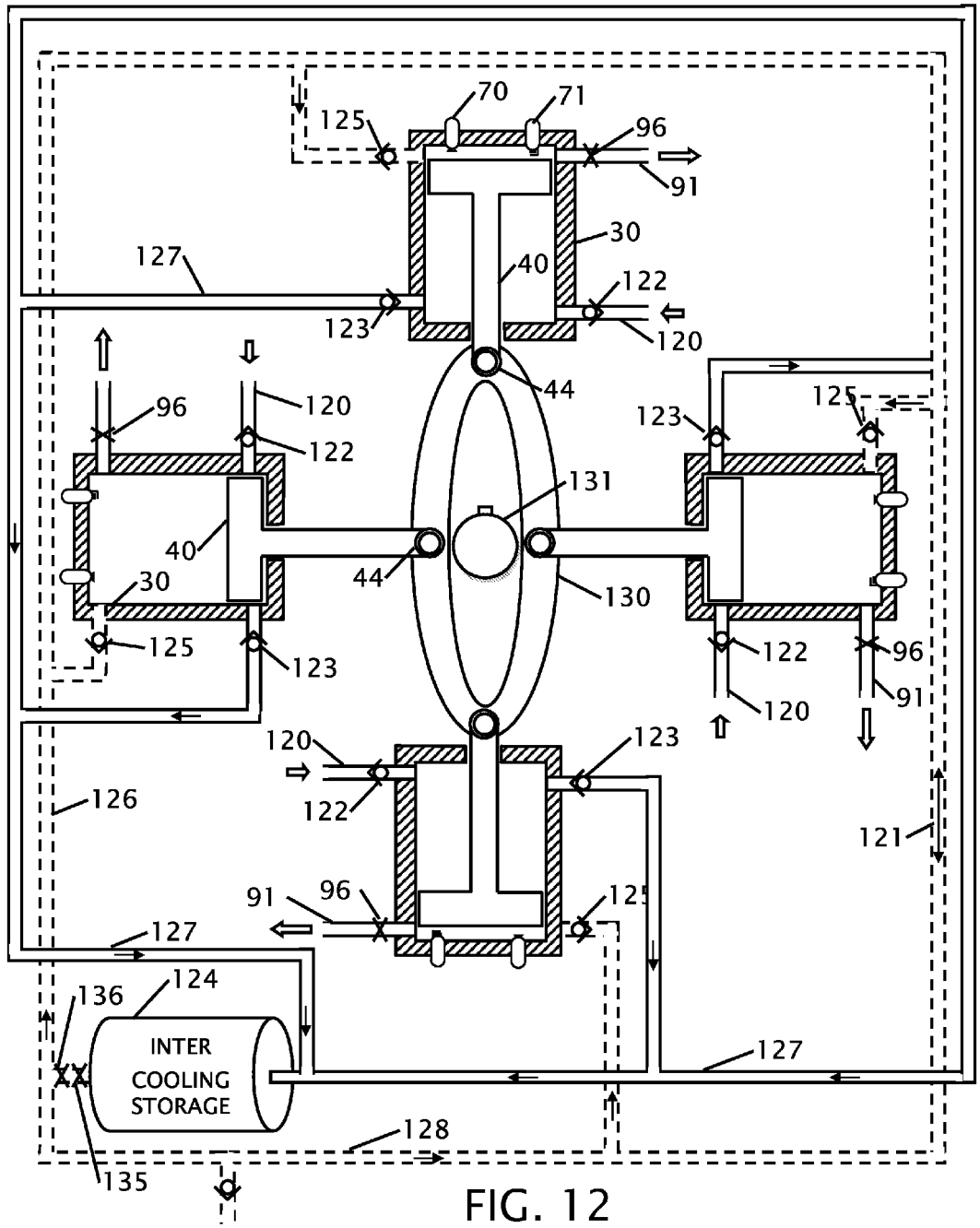

FIG. 12 shows a block diagram of a four cylinder-four cycle engine four stroke engine with an inter-cooling storage tank.

Figure 13:
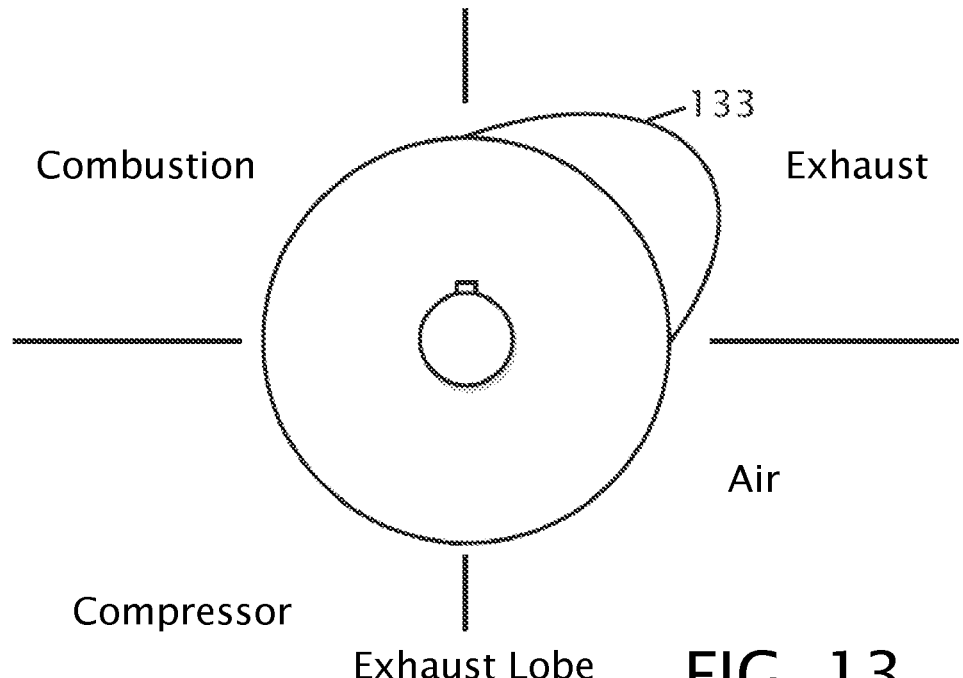

FIG. 13 shows a cam lobe for an exhaust valve of a four-stroke engine.

Figure 14:
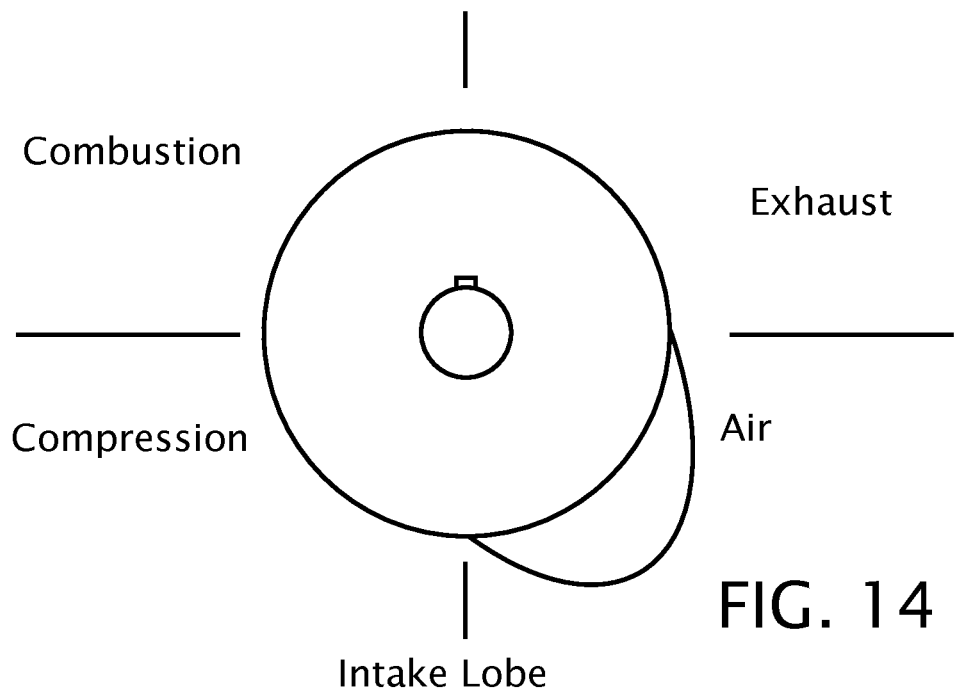

FIG. 14 shows a cam lobe for an intake valve of a four-stroke engine.

Figure 15:
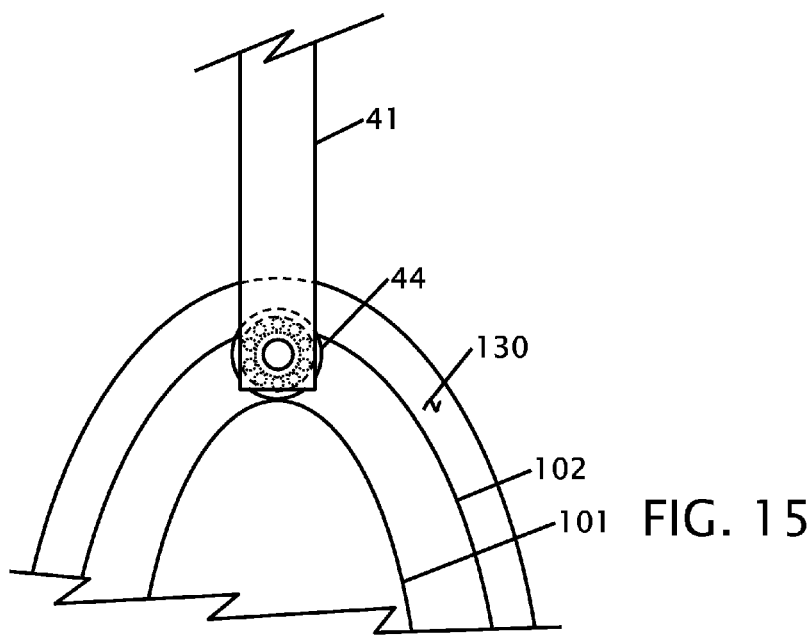

FIG. 15 shows a first preferred embodiment of a piston rod connected to an elliptical shaft device.

Figure 16:
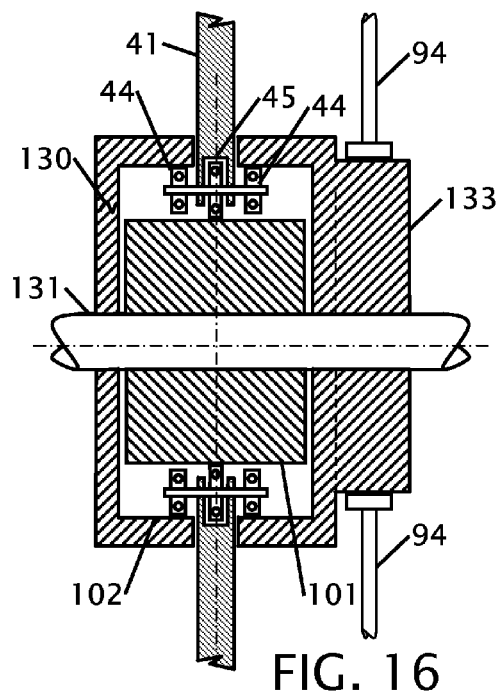

FIG. 16 shows a cross sectional view of the piston rod, elliptical shaft device with a cam lobe for exhaust valves for the Type I and Type II engines.

Figure 17:
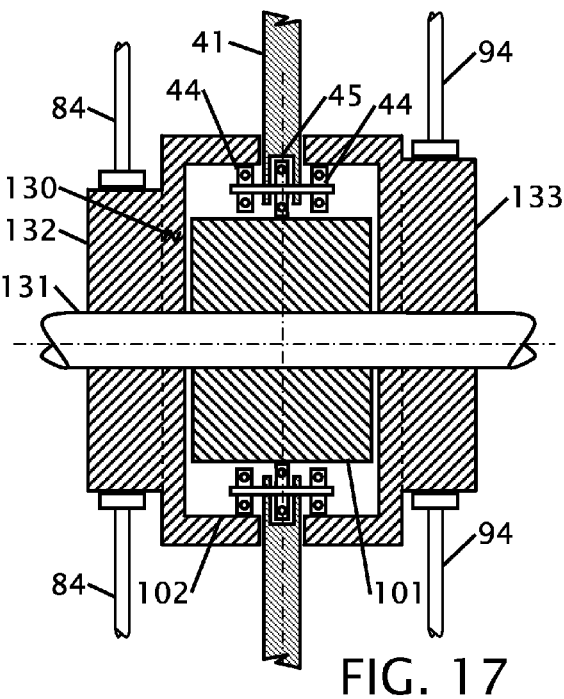

FIG. 17 shows a cross sectional view of the piston rod, elliptical shaft and a cam lobe for an air valve and a cam lobe for an exhaust valve for a Type III and IV engine.

Figure 18:
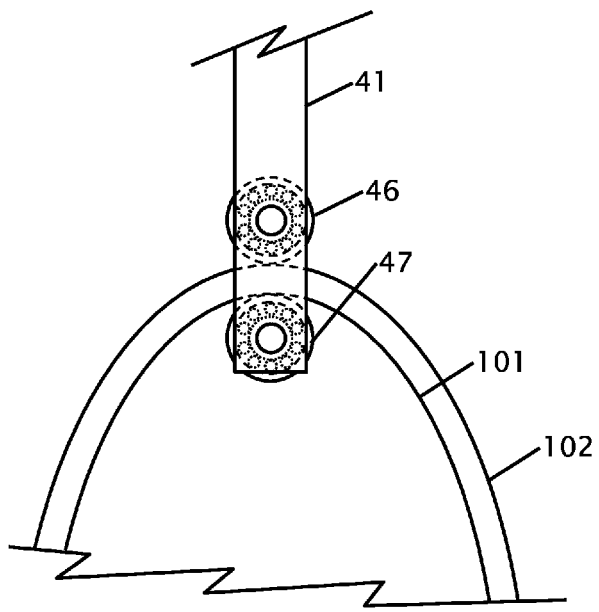

FIG. 18 shows a second preferred embodiment of a piston rod connected to an elliptical shaft.

Figure 19:
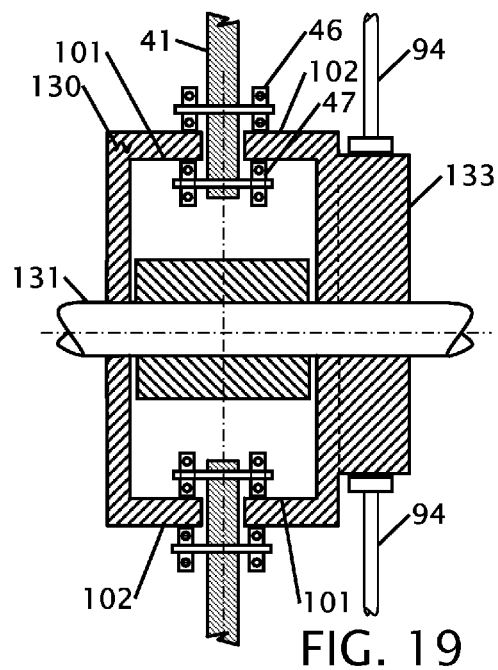

FIG. 19 shows a cross sectional view of the piston rod, elliptical shaft and a cam lobe for exhaust valves for the Type I and Type II engines.

Figure 20:
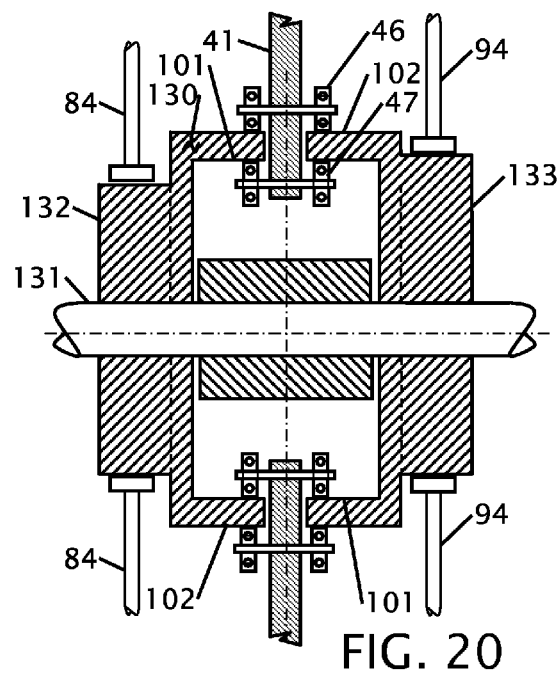

FIG. 20 shows a cross sectional view of the piston rod, elliptical shaft and a cam lobe for an air valve and a cam lobe for an exhaust valve for a Type III and IV engine.

Figure 21:
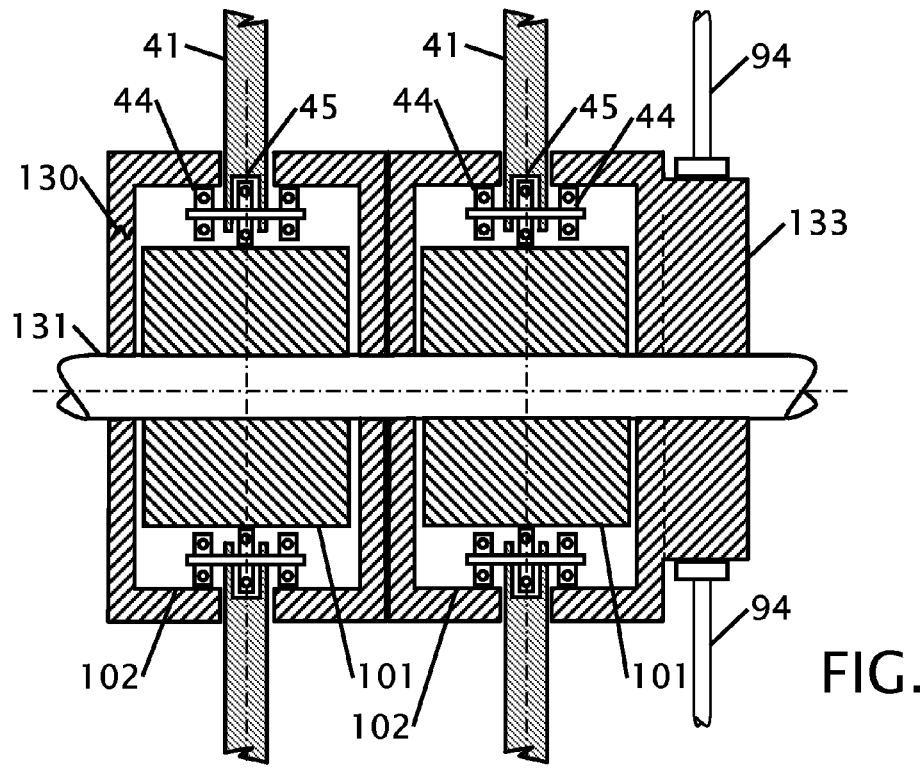

FIG. 21 shows a cross sectional view of dual piston rods with a single cam lobe.

Figure 22:
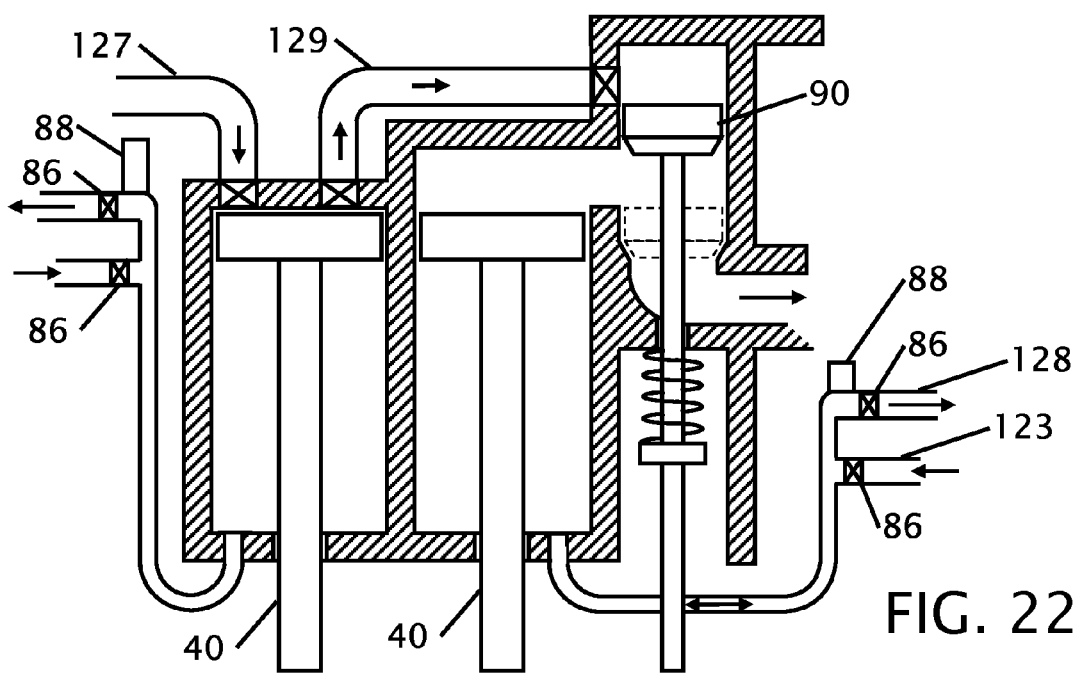

FIG. 22 shows a cross sectional view of a preferred embodiment of the combustion cylinder and compressor cylinder with a three position spool valve.

Figure 23:
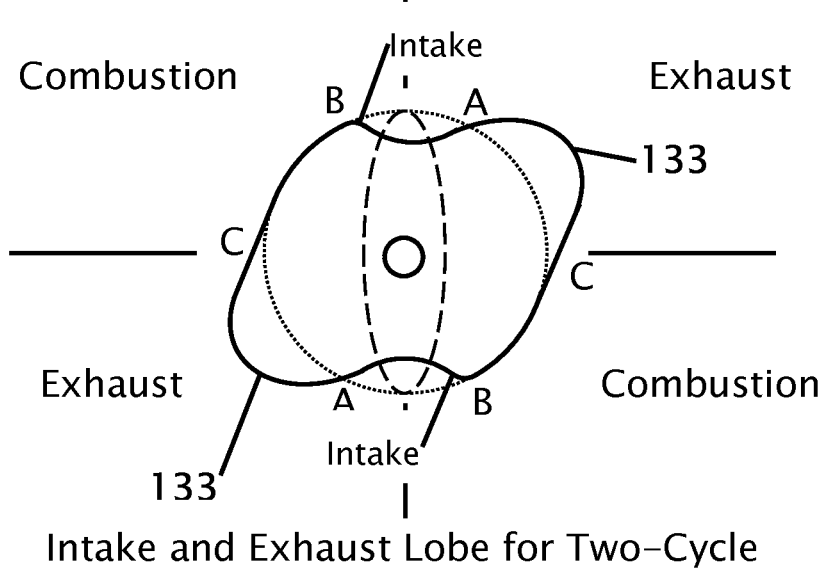

FIG. 23 shows a cam lobe that operates a spool valve for a two-cycle engine.

Figure 24:
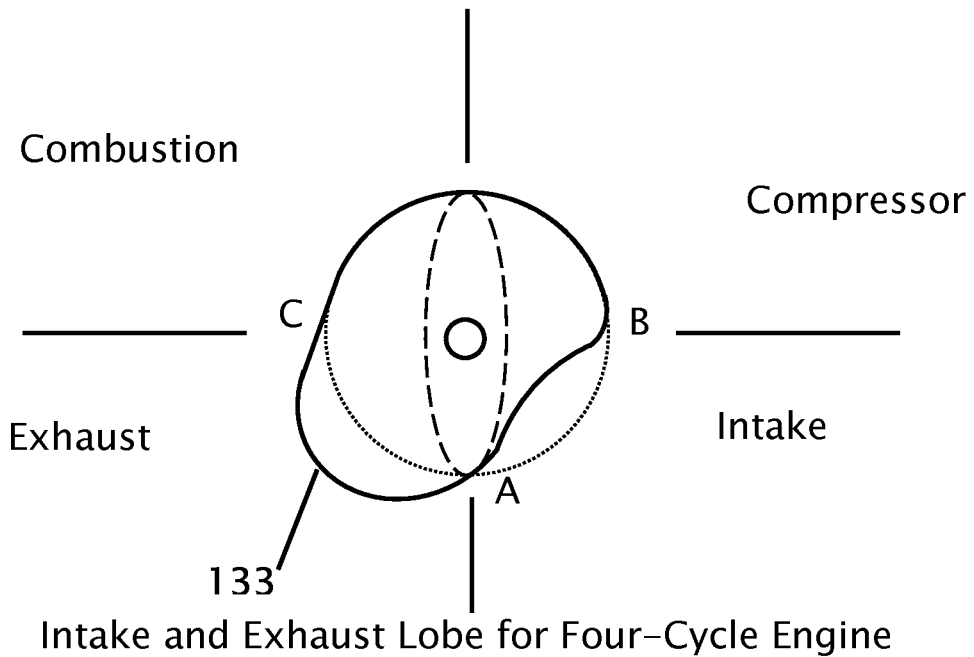

FIG. 24 shows a cam lobe that operates spool valve for a four cycle engine.

Figure 25:
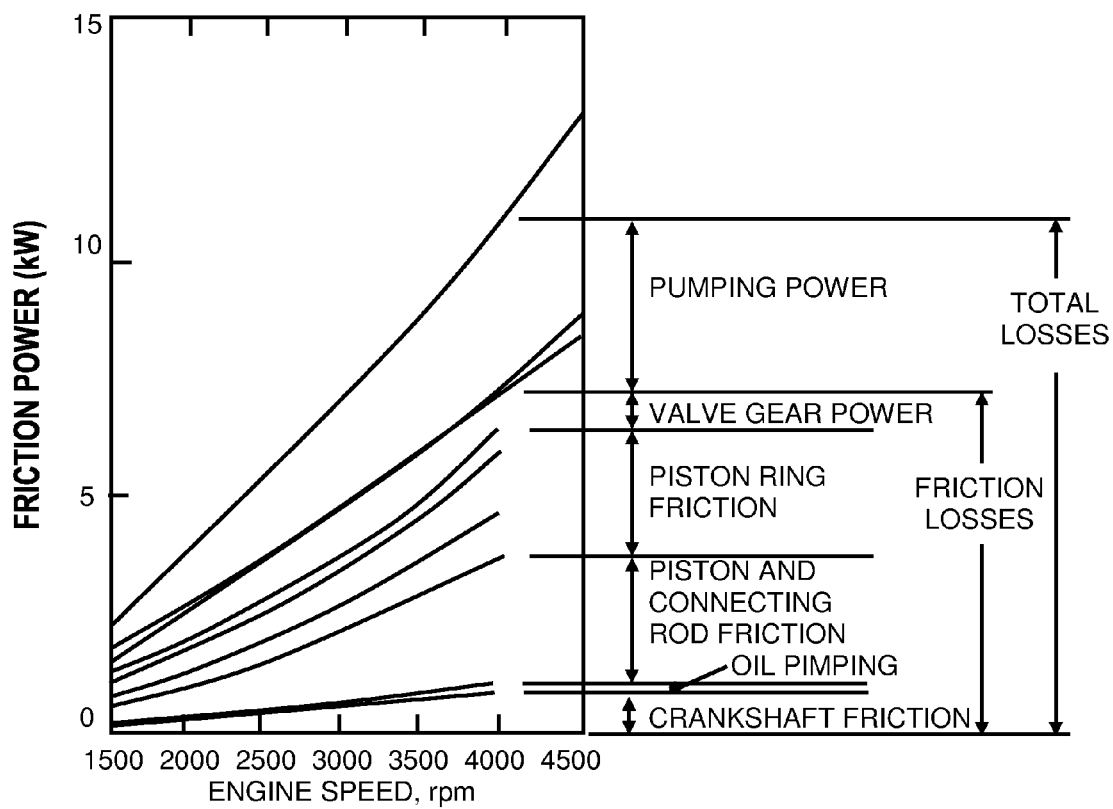

FIG. 25 shows a graph of where power is consumed in a typical four-stroke engine at various engine speeds.

Figure 26:
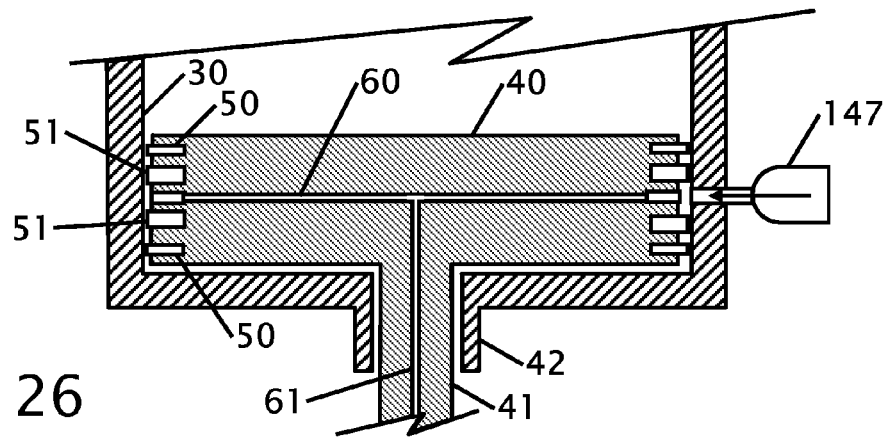

FIG. 26 shows a cut-away view of an oil injection system using an injector that is similar to a fuel injector.

Figure 27:
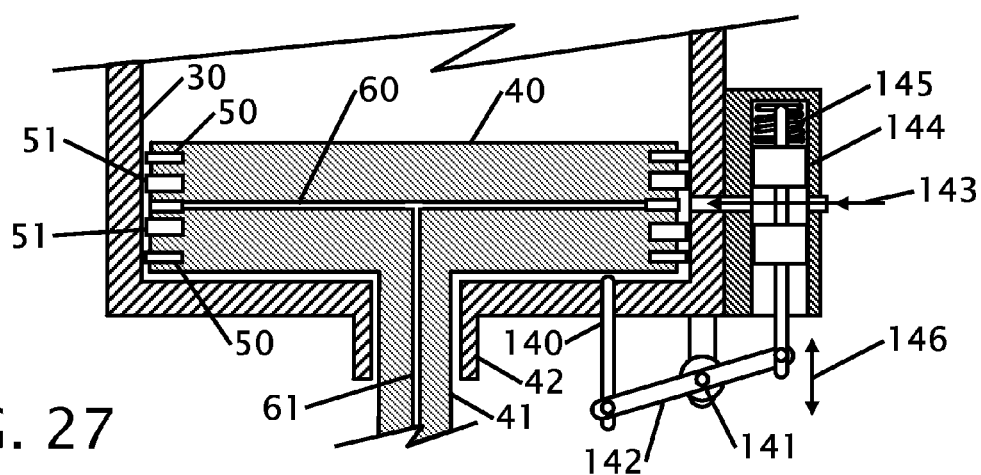

FIG. 27 shows a cut-away view of an oil injection system using an injector with the spool valve in the open position.

Figure 28:
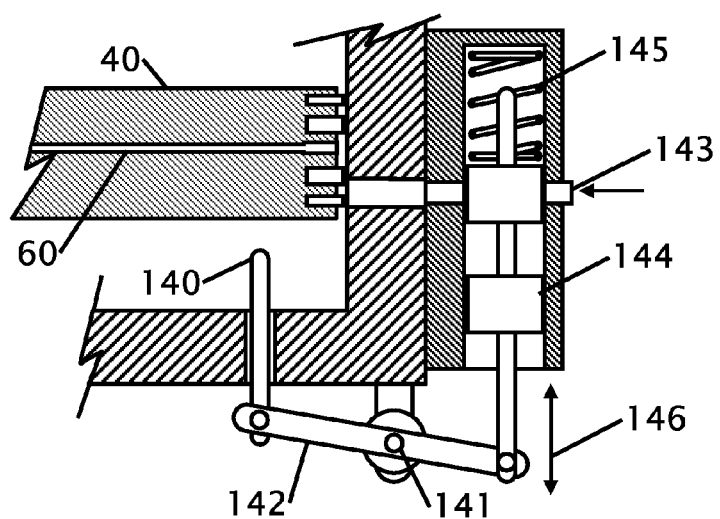

FIG. 28 shows a cut-away view of an oil injection system using an injector with the spool valve in the closed position.

Figure 29:
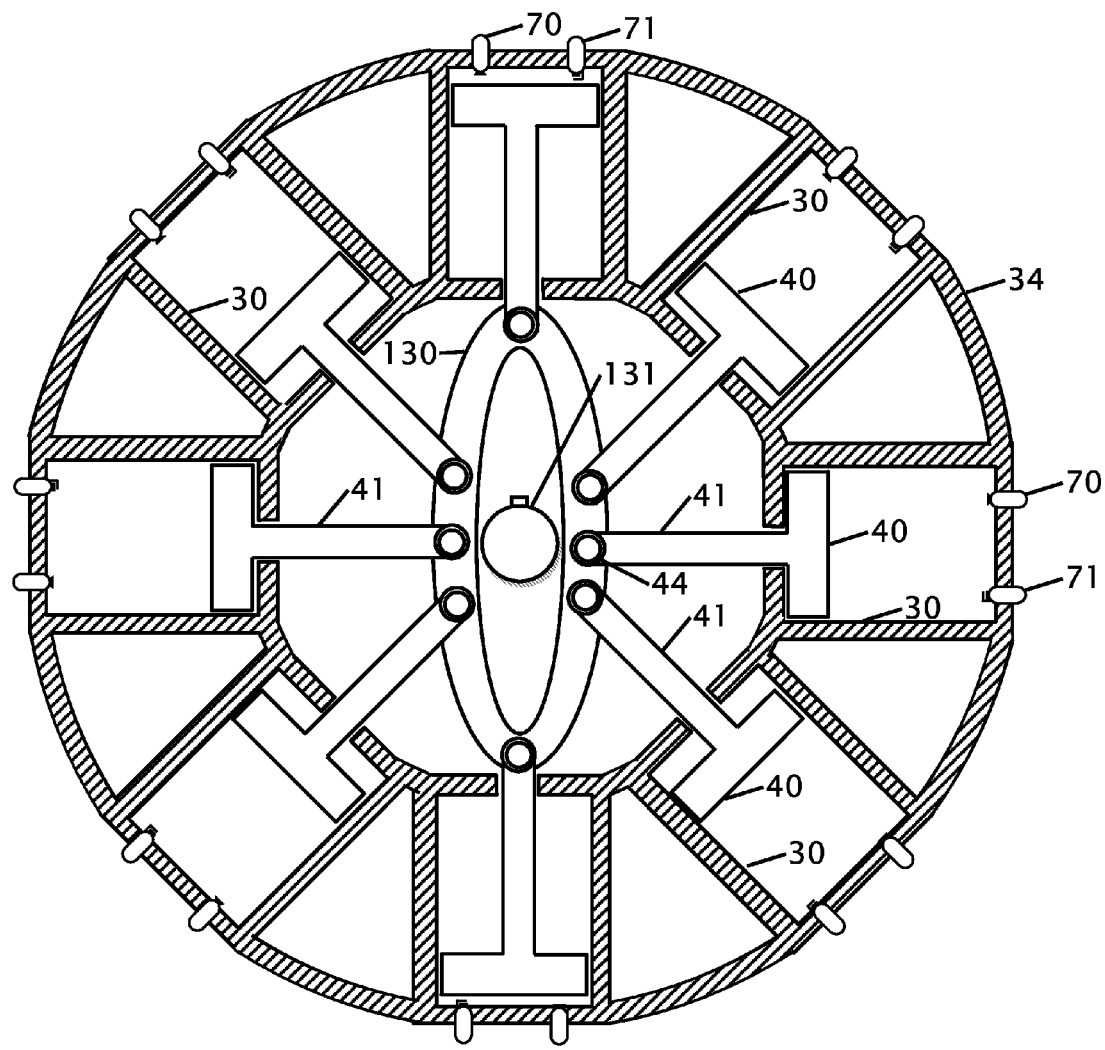

FIG. 29 shows simplified cross sectional view of a first preferred embodiment of the engine with eight cylinders on one elliptical device that includes two lobes for exhaust valves and two lobes for intake valves.

Figure 30:
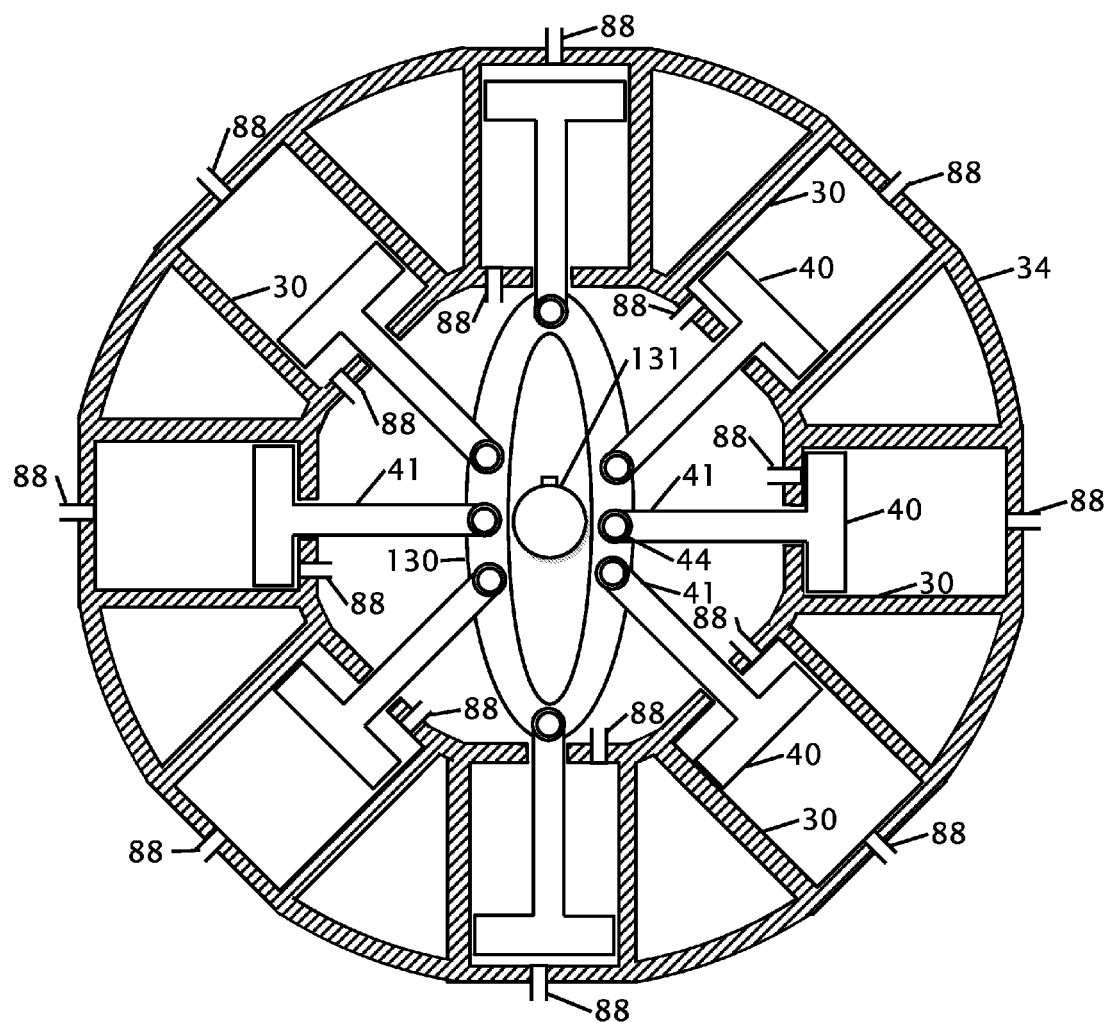

FIG. 30 shows simplified cross sectional view of a second preferred embodiment of the compressor with eight cylinders on one elliptical device that is located after the transmission in a vehicle.

DETAILED DESCRIPTION OF THE INVENTION

The engine/compressor can be one of four types. Type I is a two-stroke engine, Type II is a four-stroke engine with supercharger and Type III is a two-stroke compressor. The figures show various spaces above and below the pistons. These spaces are for the purposes of illustration only and change based upon the design requirements. In general the spacing above a piston is greater than the spacing below the piston for clearance of a spark plug, air movement and or fuel injection.

Figure 1:
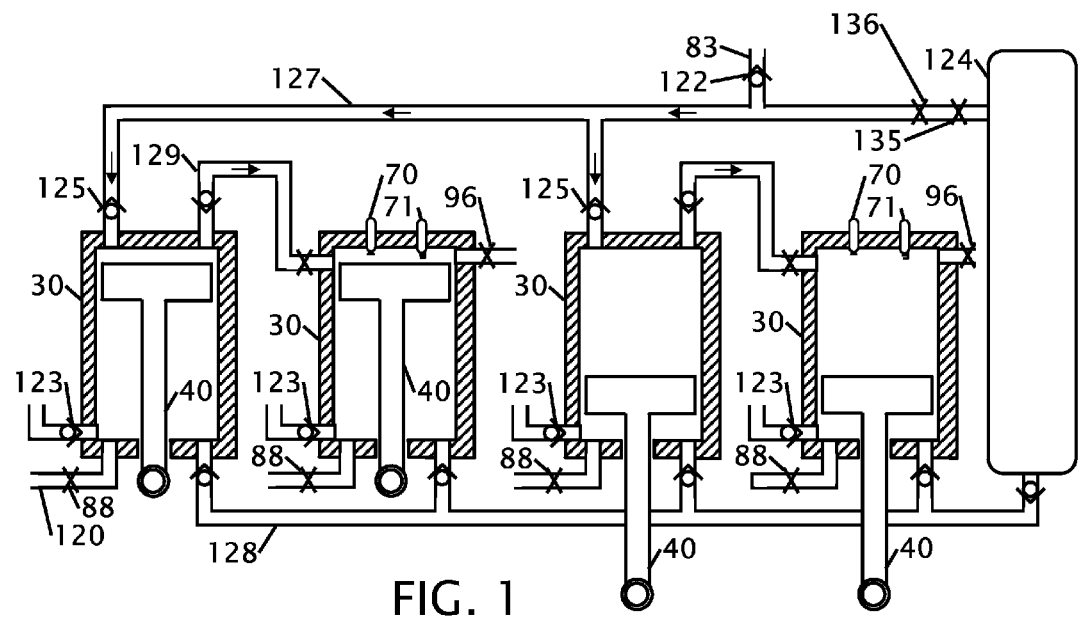
FIG. 1 shows a block diagram of a two cycle air hybrid engine.
Figure 2:
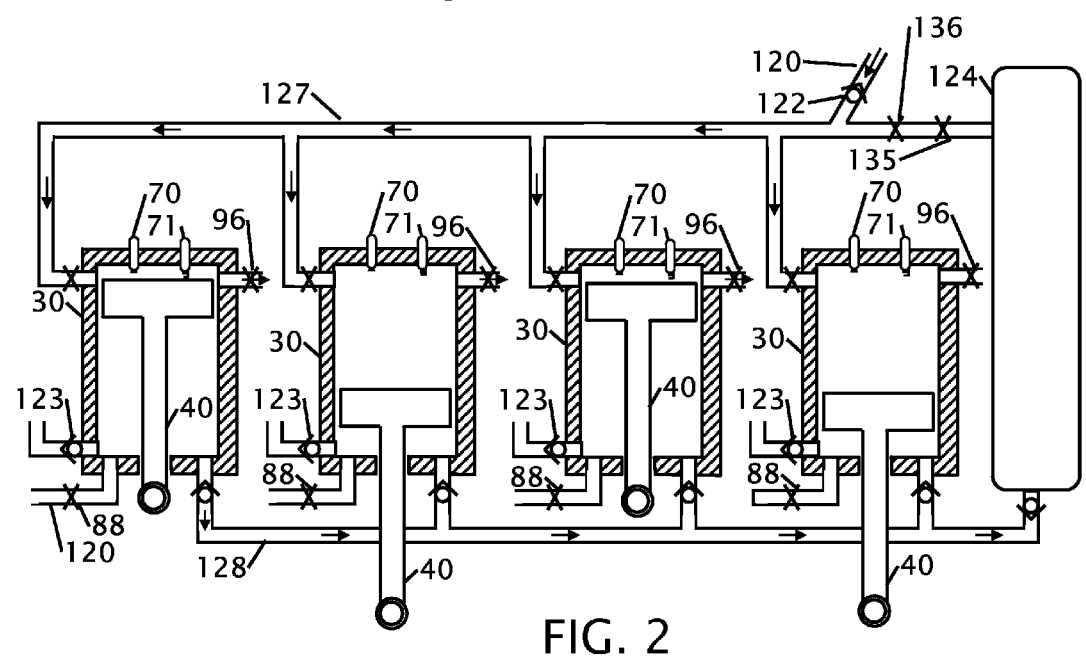
FIG. 2 shows a block diagram of a four cycle air hybrid engine.

FIG. 1 shows a block diagram of a two cycle air hybrid engine and FIG. 2 shows a block diagram of a four cycle air hybrid engine. Each of these figures shows four separate cylinders 30 where each cylinder 30 has a piston 30. The piston(s) 40 divide each cylinder into an upper chamber and a lower or compressor chamber. In FIG. 1 only two of the cylinders 30 have a fuel injector 70 and a spark plug 71 while in FIG. 2, all of the cylinders have a fuel injector 70 and a spark plug 71. Atmospheric air and or natural aspirated air 83 enter through check valve 122 that is brought either directly into the cylinders or into a supply pipe 127.

As the piston 40 goes up, the piston will both compress air within the upper chamber on top of the cylinder 30 and draw air into the lower or compressor chamber. When the air/fuel mixture located in the upper chamber is ignited and expands, the piston 40 will be driven down and compress the air located in the lower or compressor chamber. The compressed air will then flow from the lower or compressor chamber through return pipe 128 and into a storage tank 124.

In FIG. 1, two of the pistons are configured such that the compressed air in the upper chamber flows through a transfer pipe 129 and into an adjoining cylinder. A series of one-way check valves 123 ensure that air flows into and out of the cylinders 30 ad the storage tank 124 in the proper direction. Pressurized air in the storage tank 124 is controlled with two valves. The first valve 135 is operated by an ignition key and a second valve 136 is operated by a brake pedal or by an electrical and or hydraulic control that coordinates between braking and vehicle control. The lower or compressor chamber has a valve 88 that is controlled by the brake pedal of the vehicle or by an electrical controller to allow the lower or compressor chamber to operate in a compressor mode or in an idle mode. The air intakes for the upper chambers supplies air from an air line 127 that is connected to the air storage tank 124 and the air line has a branch line with a check valve 122 that allows air flow into the air line 122 when the first valve 135 and or the second valve 136 is closed.

During acceleration and starting, the engine will use the compressed air from within the storage tank 124 to supply the upper chambers intake/compressor to create a higher pressure wherein the higher pressure is sent to the upper chambers to function as a combustion/air motor. A controller (not shown) will coordinate powering said vehicle using pressure in the air storage tank and fuel supply.

FIGS. 3 and 4 show cut-away views of a preferred embodiment of the dual chamber cylinder. An internal combustion engine has one or more cylinders 30 where each cylinder 30 is divided by a piston 40 into an upper and lower chamber. The piston(s) 40 slide with reciprocating rectilinear motion inside the cylinder 30 with a piston rod or arm 41. The piston rod 41 exists in a fixed orientation to the piston 40 and slides in and out of the cylinder through a guided tube with seal 42 in the end of the cylinder, using low friction seal(s). There are two types of operation for the cylinders. Type I has one chamber for combustion/exhaust and a second chamber for air/compression which is herein called a two-stroke engine. The second type II uses one chamber for air/compress/combustion/exhaust and a second chamber for air/compression which is herein called a four-cycle engine with supercharger.

The bottom of the cylinder has a pipe 82 and the pipe 82 is connected to an outlet check valve 123 and then into line 128, or the air passes thought a separate check valve 123 to the lower chamber, or to a third valve 88 for free flow of air through the cylinder. A valve 90 is a spool valve that exists in one of three positions to a) allow intake air into the combustion chamber and closes the exhaust outlet; b) closes both the inlet and the outlet ports for the combustion cycle, and c) to allow the exhaust out and closes the inlet air for the exhaust cycle.

The piston rod 41 will slide in and out of the cylinder through a guided tube in one end of the cylinder using a low friction seal 42. The piston, which can slide with reciprocating rectilinear motion inside the cylinder between a bottom dead center (BDC) and top dead center (TDC) a device such as an ellipse shaft converts the reciprocating rectilinear motion of the piston into rotary motion of the engine shaft. The piston arm 41 movement distance between the bottom dead center (BDC) and the top dead center (TDC) is equal to a half difference of the major axis and the minor axis of the ellipse shaft and each shafting will turn the engine shaft at 90 degrees rather than 180 degrees as in an existing engine. The ellipse or elliptical crank 100 shaft has two walls, an inside wall 101 to push the piston rod into the cylinder and an outside wall 102 to pull out the piston rod out of the cylinder. The ellipse or elliptical crank is shown and described in more detail with FIGS. 14-19 herein. The piston rod or arm 41 terminates in a piston arm guide 43 with two roller set against the outside wall 102 and the second roller bearings 45 set against the inside wall 101.

A head 31 closes the top of the cylinder 30. The head 31 includes provisions for a fuel injector 70 for supplying fuel into the air stream of the intake and a spark plug 71 to ignite a compressed gas/air mixture with the cylinder 30. Air enters into the cylinder from the intake port where air 81 comes in 80 through an intake check valve. Exhaust air 91 exits the cylinder from the exhaust port where exhaust air 91 comes through the exhaust valve 90. The exhaust valve 90 is held closed by an exhaust valve spring 92 that pushes on an opposing exhaust valve spring stop 93. The exhaust valve 90 has an exhaust valve lifter 94 that is lifted with an exhaust cam lobe 95 located on the crank 100.

The piston 40 seals against the inside of the cylinder 30 with a series of compression 50 and oil rings 51. An oil tube or pipe 60 and an oil drain 61 moved oil out the piston. The oil passage into the oil pipe 60 is shown and described in more detail with FIGS. 26, 27 and 28. Because oil enters in the middle of the piston 40 there are oil rings 50 on both sides of the oil pipe 60 with compression rings 50 near the outer surfaces of the piston 40.

FIG. 5 shows a cut-away view of a second preferred embodiment of the dual chamber cylinder type III and FIG. 6 shows a cut-away view of the one chamber cylinder. An internal combustion engine has one or more cylinders 30 where each cylinder 30 is divided by a piston 40 into an upper and lower chamber. The piston(s) 40 slide with reciprocating rectilinear motion inside the cylinder 30 with a piston rod or arm 41. The piston rod 41 exists in a fixed orientation to the piston 40 and slides in and out of the cylinder through a guided tube or piston arm seal 42 in the end of the cylinder, using low friction seal(s). This Type III uses one chamber for air/compress/combustion/exhaust.

The piston rod 41 will slide in and out of the cylinder through a guided tube in one end of the cylinder using a low friction seal 42. The piston, which can slide with reciprocating rectilinear motion inside the cylinder between a bottom dead center (BDC) and top dead center (TDC) a device such as an ellipse shaft converts the reciprocating rectilinear motion of the piston into rotary motion of the engine shaft. The piston arm 41 movement distance between the bottom dead center (BDC) and the top dead center (TDC) is equal to a half difference of the major axis and the minor axis of the ellipse shaft and each shafting will turn the engine shaft at 90 degrees rather than 180 degrees as in an existing engine. The ellipse or elliptical crank 100 shaft has two walls, an inside wall 101 to push the piston rod into the cylinder and an outside wall 102 to pull out the piston rod out of the cylinder. The ellipse or elliptical crank is shown and described in more detail with FIGS. 15-20 herein. The piston rod or arm 41 terminates in a piston arm guide 43 with two roller bearings 44. One set of roller bearings is set against the outside wall 102 and the second set of roller bearings is set against the inside wall 101.

A head 31 closes the top of the cylinder 30. The head 31 includes provisions for a fuel injector 70 for supplying fuel into the air stream of the intake and a spark plug 71 to ignite a compressed gas/air mixture with the cylinder 30. Air enters into the cylinder from the intake port where air 81 comes in 80 through an intake valve 80. The air that enters from the intake valve 80. The intake valve is held closed by an intake valve spring 82 that pushes on an opposing intake valve spring stop 83. The intake valve 80 has an intake valve lifter 84 that is lifted with an intake cam lobe 85 located before the crank 100. Exhaust air 91 exits the cylinder from the exhaust port where exhaust air 91 comes through the exhaust valve 90. The exhaust valve 90 is held closed by an exhaust valve spring 92 that pushes on an opposing exhaust valve spring stop 93. The exhaust valve 90 has an exhaust valve lifter 94 that is lifted with an exhaust cam lobe 95 located after the crank 100.

In FIG. 5 the intake port 81 further includes a check valve 87 that prevents back flow of air through the intake port 81 when the cylinder is being used as a compressor. The piston 41 in this figure further includes internal oil lubrication pipes 60 and 61.

FIG. 6 show cut-away views of a compressor cylinder using dual chamber cylinder. An internal combustion engine has one or more air pump cylinders 33 where each cylinder 33 is divided by a piston 40 into an upper and lower chamber. The piston(s) 40 slide with reciprocating rectilinear motion inside the cylinder 30 with a piston rod or arm 41. The piston rod 41 exists in a fixed orientation to the piston 40 and slides in and out of the cylinder through a guided tube or piston arm seal 42 in the end of the cylinder, using low friction seal(s).

The piston rod 41 will slide in and out of the cylinder through a guided tube in one end of the cylinder using a low friction seal 42. The piston, which can slide with reciprocating rectilinear motion inside the cylinder between a bottom dead center (BDC) and top dead center (TDC) a device such as an ellipse shaft converts the reciprocating rectilinear motion of the piston into rotary motion of tan engine shaft. The piston arm 41 movement distance between the bottom dead center (BDC) and the top dead center (TDC) is equal to a half difference of the major axis and the minor axis of the ellipse shaft and each shafting will turn the engine shaft at 90 degrees rather than 180 degrees as in an existing engine. The ellipse or elliptical crank 100 shaft has two walls, an inside 101 wall to push the piston rod into the cylinder and an outside wall 102 to pull out the piston rod out of the cylinder. The ellipse or elliptical crank is shown and described in more detail with FIGS. 15-20 herein. The piston rod or arm 41 terminates in a piston arm guide 43 with two roller bearings 44. One set of roller bearings is set against the outside 102 wall and the second set of roller bearings is set against the inside wall 101. The each chamber of cylinder 33 has one air intake check valve 86 and one compressed air outlet check valve 96. Operable valve(s) 88 open and close based upon the braking or control of the driver/brake pedal or control system to allow the cylinder to operate as a compressor to pump compressed air into a storage tank to store energy that would normally be wasted in braking.

Two-Stroke Engine.

FIG. 7 shows a block diagram of two cylinders acting as a four cylinder engine. This is accomplished by using the downward stroke of the first cylinder to generate power for the engine and at the same time compresses the air in the lower chamber to use in the second cylinder. The downward stroke of the second cylinder generates power for the engine and compresses air for the first cylinder. The components of these cylinders is the same or similar to the components shown and described in FIG. 3. The air valve shown in FIG. 10 and the cam lobe have exhaust lobes 133.

A fuel injector 70 and a spark plug 71 exist on the top or head of the cylinder. On the up stroke of a piston 40 atmospheric air 120 is brought into the underside of the cylinder 30 through a one-way check valve 122. When the piston 40 goes down the air within the cylinder is compressed and passes through a piston actuated valve 110 and through a one way check valve 123 where the pressurized air line 121 pushes the compressed air into the top of a piston though one-way check valve 86 where it is mixed with injected fuel from the fuel injector 70 and detonated with the spark plug 71. The piston 40 is then driven down with the expanding gas. The piston 40 then moves up and expel the burnt exhaust through valve 96 and out the exhaust port 91.

FIG. 8 is the same as FIG. 7 except for the addition of one compressor cylinder for the system to act as a supercharger. The components and functions of FIG. 8 is the same as FIG. 7. The compressor 33 pushes the compressed air through line 126 and then through the piston valve 110 to the cylinder 32. From FIG. 8, both strokes of the air pump cylinder 33 bring in air from the outside into air lines 81 through one way valves 86. The air within the pressurized air line 126 is also increased by the downward stroke of the work cylinders 32.

The engine in FIG. 9 has a fuel injector 70 and a spark plug 71. The cylinder 30 has a pressurized air line 121 with a one-way intake check valve 86 and an exhaust valve 96 where the burned exhaust exits out the exhaust port 91. In the lower portion of the cylinder air is brought into 120 the underside of the piston 40 through one-way valve 122 as the piston moves up in the cylinder 30. When the piston 40 moves down the air under the piston 40 is compressed and exits the bottom of the cylinder 30 only when the underside of the piston 40 depresses the stem 111 of the piston actuated valve 110. The piston actuated valve 110.

FIG. 10 has a stopper piston 115 that blocks the compressed air from line 126 and from the same cylinder and blocks outlet line 121. The piston has vent holes 112 to allow the pressure to equalize the pressure in the upper and lower portions of the stopper piston 115. The piston is held in a closed position by spring 113. When the underside of piston cylinder 40 pushes down on the stem 111 the spring force in overcome and the stopper piston 115 is pushed down thereby allowing flow from line 126 and from the bottom of the cylinder to go through line 121 to the other cylinders. The spring 113 and the stopper piston 115 are maintained in a housing 114 that seals the pressurized air line 121 and the pressurized line 126.

FIG. 11 shows the cam lobes 133 for the left exhaust valve for the two-stroke engine.

Four-Stroke Engine

FIG. 12 shows a block diagram of a four cylinder-four cycle engine. The components of these cylinders is similar to previous described with the cylinder(s) 30 having an internal piston 40 connected to a fixed piston arm through a bearing 44 to an elliptical crank 130 that turns drive shaft 131. A fuel injector 70 and a spark plug 71 exist on the top or head of the cylinder. On the up stroke of a piston 40 atmospheric air 120 is brought into the underside of the cylinder 30 through a one-way check valve 122. When the piston 40 goes down the air within the two cylinders is compressed and passes through a one way check valve 123 where the pressurized air line 127 pushes the compressed air into air storage tank 124. The pressurized air from the air storage tank 124 is sent to the combustion chambers through air line 128 that has a first valve 135 that is operated by the ignition key and a second valve 136 that is operated by a brake pedal or by an electrical and or hydraulic control that coordinated between braking and vehicle control. The line 128 has a branch line 83 with a check valve 122 that allows air flow into the air line 128 when the first valve 135 and or the second valve 136 is closed to allow the combustion chamber to work with naturally aspirated air and stored air pressure that is stored in the storage tank 124 during deceleration. During acceleration the top of a piston though check valve 125 where it is mixed with injected fuel from the fuel injector 70 and detonated with the spark plug 71. The piston 40 is then driven down with the expanding gas. The piston 40 then moves up and expel the burnt exhaust through valve 96 and out the exhaust port 91. A storage tank 124 is used to store the pressurized air from the down strokes of the pistons. Alternately it is contemplated that upon the down stroke the air under the piston can pass through a one-way valve within the piston to the top side of the piston. The component of these cylinders is the same or similar to the components shown and described in FIGS. 3 and 4.

FIG. 13 shows a cam lobe 133 for the exhaust valves lifter for a four-stroke engine and FIG. 14 shows a cam lobe for the intake lifter for a four stroke engine.

FIG. 15 shows a first preferred embodiment of a piston rod 41 connected to an elliptical shaft 130. FIG. 16 shows a cross sectional view of the piston rod and elliptical crank with cam lobes 133 for exhaust lifter valves 94 and FIG. 17 shows a cross sectional view of piston rod 43 and elliptical crank 130 with two cam lobes 132 for intake air valves. Cam lobes 133 are used for operating exhaust valves. The piston rod 41 is supported on three bearings 44 and 45. Bearing 45 rolls on the inside wall 101 and bearings 44 roll on the outside walls 102. Bearing 45 is called a push bearing and bearings 44 are called pull bearings.

FIG. 18 shows a second preferred embodiment of a piston rod 41 connected to an elliptical shaft 130. FIG. 19 shows a cross sectional view of the piston rod and elliptical crank with cam lobes 133 for exhaust lifter valves 94 and FIG. 20 shows a cross sectional view of piston rod 43 and elliptical crank 130 with two cam lobes 132 for intake air valves. FIG. 21 shows a cross sectional view of dual piston rods with a single cam lobe. Cam lobes 133 are used for operating exhaust valves. The piston rod 41 is supported on four bearings 46 and 47. Bearing 47 rolls on the inside wall 101 and bearings 46 roll on the outside walls 102. Top bearing 46 is called a push bearing and bottom bearings 47 are called pull bearings.

FIG. 22 shows a cross sectional view of a preferred embodiment of a two cycle engine. The figure shows two cylinders. The first upper chamber cylinder is used as a compressor; the intake air is used from air line 127 and has a check valve. The air line 127 is connected to air storage tank 124 through a first valve 135 and a valve 136. During normal operation and acceleration the intake air uses air from the air storage tank and during deceleration the intake air uses the air from outside of the engine or naturally aspirated air.

The compressed air from the first chamber will be sent to the second chamber/combustion chamber through air line 129 that has two check valves. The two lower chambers work as compressors during deceleration for energy recovery and the two chambers have three valves. The first valve is for air intake with a check valve 86. The second valve is for the outlet of air through check valve 86. The third valve 88 is to operate the chamber in compressor mode or for an idle mode. The combustion chamber uses a spool valve 90 that exists in one of three positions to a) allow intake air into the combustion chamber and closes the exhaust outlet; b) closes both the inlet and the outlet ports for the combustion cycle, and c) to allow the exhaust out and closes the inlet air for the exhaust cycle. It is further contemplated that the compression cylinders can further include a fuel injector and a spark plug to allow the cylinders to operate as an engine.

FIG. 23 shows a cam lobe that operates a spool valve for a two-cycle engine. The lobe is divided into three regions. The first region A-B is for the intake air cycle and the second region B-C is for the combustion cycle and the third region C-A is for the exhaust cycle.

FIG. 24 shows a cam lobe that operates spool valve for a four cycle engine. The lobe is divided into three regions. The first region A-B is for the intake air cycle and the second region B-C is for the combustion cycle and the third region C-A is for the exhaust cycle.

FIG. 25 shows a graph of where power is consumed in a typical four stroke engine at various engine speeds. From this graph the crankshaft friction, piston and connecting rod friction oil pumping, piston ring friction, valve gear power and the pumping power are shown at engine speeds of 1,500 to about 4,000 rpm. In the disclosed design the drive mechanism for the valve cam is eliminated because the valves are moved with lobes on the same shaft of the crank shaft. Frictions from angular rotation of the piston on the piston arm and piston side drag on the cylinder walls are also eliminated. The aerodynamic drag under the piston is also eliminated (not shown in this graph).

FIGS. 26-28 show cut-away views of an oil injection system. About two-thirds of an engine friction occurs in the piston and rings, and two-thirds of this is friction at the piston rings. All friction that occurs due to side-to-side force is eliminated because there are no side forces in the proposed design; therefore there are three alternatives of lubrication. In the first preferred embodiment, oil is injected in a method similar to fuel being injected into the cylinders as shown in FIG. 26. The second preferred embodiment is with oil being injected through an oil valve shown in FIGS. 27 and 28.

In FIG. 26 shows the first preferred embodiment of a cut-away view of an oil injection system using an injector that is similar to a fuel injector. In this figure the oil injector 147 injects oil into the oil pipe 60 when the piston 40 is at or near the bottom of the stroke.

FIGS. 27-28 show second preferred embodiment a oil valve 144 is used to force oil onto the piston rings between the two oil rings 51 that will inject or pump oil when the piston 40 reaches the bottom of the cylinder 30 when the oil is channeled into the piston 40 and then goes into an oil pipe 60 then into the oil or into the piston rod 41. The oil will then drain through the oil drain 61 and then goes over the roller and then into a sump pump. The piston has two compression rings 50 and two oil rings 51 and one oil channel 61 and an oil pipe 60.

From the detail shown in FIGS. 25 and 26, when the piston 40 reaches near the bottom of the stroke the bottom of the piston 40 will make contact with a stem 140 that is linked through an arm 142 on a pivot 141. The arm will lift 146 the valve 144 where oil will then be injected 143 through the cylinder 30 wall into the oil pipe 60. A spring 145 maintains the injector 143 in a closed orientation until the piston 40 and oil injector 143 are sufficiently aligned at the bottom of the stroke.

A third alternative is to lubrication using a fuel and oil mixture that is commonly used with two stroke engines.

FIG. 29 shows a simplified cross sectional view of the engine with eight cylinders on an elliptical crank. The components of these cylinders is similar to previous described with the cylinder(s) 30 having an internal piston 40 connected to a fixed piston arm through a bearing 44 to an elliptical crank 130 that turns drive shaft 131. A fuel injector 70 and a spark plug 71 exist on the top or head of the cylinder. Each piston 40 has a piston arm 41 that connects through a bearing onto the elliptical crank 130 that turns the drive shaft 131. The cylinders could be various types of mixed cylinders selected between engine cylinders and compression cylinders based upon desire, need or use.

FIG. 30 shows a simplified cross sectional view of the compressor with eight cylinders on an elliptical crank 130. While this view shows eight cylinders it is contemplated that as few as one cylinder to many more than eight cylinders can be used. In this embodiment the compressor is located after the transmission. The components of these cylinders 30 have an internal piston 40 that is connected to a fixed piston arm through a bearing 44 and then to an elliptical crank 130 that are turned by drive shaft 131. Each cylinder has two chambers and each chamber has an inlet check valve 86 and an outlet check valve 86 and a third valve 88 and the third valve 88 is controlled by a brake pedal or by an electrical controller to allow the chamber to operate in a compressor mode or in an idle mode. During normal operation the crank 130 will turn freely with minimal resistance because valves 88 will be open. During deceleration the valves 88 will be closed and the compressor will draw power from shaft 13 to compress the air and send the pressurized air into the air storage tank (124 not shown).

Although the invention has been described by reference to certain specific embodiment, it should be understood that numerous changes may be made within the spirit and scope of the inventive concepts disclosed. Accordingly, it is intended that the invention not be limited to the described embodiments, but that it have the full scope defined by the language of the following claims.

The invention claimed is:

1. An air hybrid engine with dual chamber cylinder comprising:
    an upper chamber for combustion/exhaust and or for intake/compression;
    a lower chamber for intake/compression wherein;
    said lower chamber and or said upper chamber are used for energy recovery and or for supercharging an engine;
    an air storage tank having a first valve operated by an ignition key and a second valve operated by a brake pedal or by an electric controller of a vehicle;
    said lower chamber and or said upper chamber is located in an engine and or downstream of a transmission;
    said storage tank further includes a pressure relief valve that opens when a pressure within said storage tank exceeds a preset threshold;
    with a housing having a first cylindrical cavity and at least a second cylindrical cavity each said cylinder cavity has a piston that divides each said cylindrical cavities into an upper chamber and a lower chamber;
    at least one head on top of said upper cylindrical chamber for enclosing said cylindrical chambers;
    each piston each having piston rods extending perpendicular from a bottom of each piston;
    a low friction seal located on a bottom of each of said cylinders to allow sealed constrained linear movement of said piston rod(s);
    said separate piston rods are secured to an elliptical shaft to convert reciprocating rectilinear motion into rotary motion;
    an inlet and an inlet check valve on each of said lower chamber cylindrical cavities for bringing air into said lower chamber when said pistons are on an up stroke;
    an outlet and an outlet check valve on said lower chamber cylindrical cavities wherein compressed air is pushed out through said outlet and outlet check valve when said pistons are on a down stroke;
    said compressed air from a first lower chamber is transferred to a first upper chamber of the same and or a separate cylindrical cavity (ies), or to said air storage tank wherein said compressed air is used to supercharge said engine or for energy recovery during deceleration;
    said at least one piston has a piston rod extending in a fixed perpendicular relationship from a bottom of said piston and extending through a low friction seal in the bottom of said at least one cylinder;
    said piston operably slides with reciprocating rectilinear motion inside said at least one cylinder;
    said piston rod is secured to an elliptical shaft device, to convert reciprocating rectilinear motion into rotary motion between a bottom dead center location and a top dead center location of an engine shaft;
    a distance between said bottom dead center and said top dead center is equal to half of the distance of a major axis and a minor axis of said elliptical shaft and each piston stroke will turn said internal combustion engine at 90 degrees;
    said elliptical shaft device, shaft has an inside wall that pushes said at least one piston into said at least one cylinder and an outside wall that pulls said at least one piston out of said at least one cylinder;
    said elliptical shaft further having a lobe(s) for operating an exhaust valve and a lobe(s) for operating an intake valve, and
    said at least one piston rod has bearings that engage said at least one piston rod on said elliptical shaft.

2. The air hybrid engine with dual chamber cylinder according to claim 1 that further includes an exhaust valve that is operable from an exhaust lobe located on an output shaft.

3. The air hybrid engine with dual chamber cylinder according to claim 2 wherein said exhaust lobe can operate more than one exhaust valve.

4. The air hybrid engine with dual chamber cylinder according to claim 1 that further includes a spark plug and a fuel injector located in said head.

5. The air hybrid engine with dual chamber cylinder according to claim 1 that further includes an oil application mechanism that injects oil through said piston rod and into a circumference of said piston between piston rings.

6. The air hybrid engine with dual chamber cylinder according to claim 1 that further includes at least one intake check valve located in said head and upstream of an inlet air valve.

7. The air hybrid engine with dual chamber cylinder according to claim 1 that further includes an intake valve that is operable from an intake lobe located on said output shaft.

8. The air hybrid engine with dual chamber cylinder according to claim 7 wherein said intake cam can operate more than one intake valve.

9. The air hybrid engine with dual chamber cylinder according to claim 1 that further includes an second inlet and a second inlet check valve on said upper chamber for bringing air into said upper chamber when a piston is on a down stroke, a second outlet and a second outlet check valve on said upper chamber wherein compressed air is pushed out through said second outlet and said second outlet check valve from above said piston is on a up stroke, and is transferred to a upper chamber of a separate cylindrical cavity(ies) or to an air storage tank.

10. The air hybrid engine with dual chamber cylinder according to claim 9 that further includes at least a third valve located in said upper chamber and/or said lower chamber whereby when said at least a third valve is closes said chamber will act as a compressor and compressed air will be sent to an air storage tank;

when said at least a third valve is opened, said chamber will not produce compressed air;

when said at least a third valve is closed by said braking system or by vehicle control during deceleration and braking, said at least a third valve will be closed by vehicle control to operate said engine in a performance mode to optimize fuel consumption, and all said at least a third valve will operate individually and by vehicle control for improved performance of said vehicle.

11. The air hybrid engine with dual chamber cylinder according to claim 9 wherein said engine/compressor is used as an air compressor for other uses such as to power construction tools.

12. The air hybrid engine with dual chamber cylinder according to claim 1 for use in a two cycle engine that further includes a piston valve that is held closed by a spring that is operated by said underside of said lower chamber of at least one of said at least one piston(s) cylinder that directly presses on a valve stem thereby directly opening said piston valve to allow compressed air to flow from under said lower chamber of said at least one piston into a pressurized air line for use in an upper chamber of another cylinder and said piston valve includes vent holes that allows equalization of pressure above and below said piston valve.

13. The air hybrid engine with dual chamber cylinder according to claim 1 wherein said intake and said exhaust lobes operate up to eight valves each.

14. The air hybrid engine with dual chamber cylinder according to claim 1 that includes two elliptical shafts wherein said two elliptical shafts are oriented in a side-by-side arrangement for a combustion cylinder and a compression cylinder and with separate lobes for operation of spool valves.

15. The air hybrid engine with dual chamber cylinder according to claim 1 that further includes a spool valve for said upper combustion chamber that is operated by a lobe located on said elliptical shaft; where a first position of said spool valve opens intake air into said combustion chamber and closes said exhaust outlet;

a second position of said spool valve closes both said intake air and said exhaust outlet, and a third position of said spool valve closes flow of said intake air into said chamber and opens flow to said exhaust outlet.

16. The air hybrid engine with dual chamber cylinder according to claim 1 further having a four cycle mode comprising:

at least four upper chambers for combustion/exhaust/intake/compression;

at least four lower chambers for intake/compression;

at least one throttling valve located in a fuel line that coordinates between air pressure in said storage tank and a fuel supply;

compressed air in said storage tank wherein said storage tank has two valves where;

a first valve is operated by an ignition key and a second valve that is operated by a brake pedal or by an electrical and or hydraulic control that coordinates between braking and vehicle control;

during deceleration a valve on said storage tank will be closed and said compressed air will be stored in said storage tank and said combustion chamber will use said air from natural aspiration;

during acceleration and starting, said engine will use said compressed air from within said storage tank and said combustion chamber to operate as a mixed mode, compression mode and air motor mode.

17. The air hybrid engine with dual chamber cylinder according to claim 1 having at least two upper chambers for combustion/exhaust;

at least two upper chambers for intake/compressor where compressed air is sent to said combustion/exhaust chamber;

at least four lower chambers that are used as compressors during deceleration and engine management;

said compressed air from said lower chamber is stored in said air storage tank wherein said air storage tank has;

a first valve is operated by an ignition key and a second valve that is operated by a brake pedal or by an electrical and or hydraulic control that coordinates between braking and vehicle control;

said lower chamber has a valve that is controlled by said brake pedal or by an electrical controller to allow said lower chamber to operate in a compressor mode or in an idle mode;

said air intake for said at least two upper chambers supplies air from an air line that is connected to said air storage tank and said line has a branch line with a check valve that allows air flow into an air line said first and or said second valve is closed;

during acceleration and starting, said engine will use said compressed air from within said storage tank to supply said at least two upper chambers intake/compressor to create a higher pressure wherein said higher pressure is sent to said at least two upper chambers to function as a combustion/air motor;

a controller will coordinate powering said vehicle using pressure in said air storage tank and fuel supply.

18. The air hybrid engine with dual chamber cylinder according to claim 1 that further includes an air compressor chamber in said vehicle that uses a second elliptical shaft and or air compressor chamber that is located downstream of said transmission of said vehicle.

\* \* \* \* \*